US012802889B2

(12) United States Patent
Somei et al.

(10) Patent No.: US 12,802,889 B2

(45) Date of Patent: Nov. 17, 2026

(54) ELECTROLYTIC CAPACITOR AND METHOD FOR PRODUCING SAME

(71) Applicant: ELNA CO., LTD., Tokyo (JP)

(72) Inventors: Hidenori Somei, Fukushima (JP); Kazuki Yamada, Fukushima (JP)

(73) Assignee: ELNA CO., LTD., Tokyo (JP)

( * ) Notice: Subject to any disclaimer, the term of this patent is extended or adjusted under 35 U.S.C. 154(b) by 126 days.

(21) Appl. No.: 18/872,958

(22) PCT Filed: Jun. 12, 2023

(86) PCT No.: PCT/JP2023/021737

§ 371 (c)(1),
(2) Date: Dec. 9, 2024

(87) PCT Pub. No.: WO2024/004616

PCT Pub. Date: Jan. 4, 2024

(65) Prior Publication Data

US 2025/0357051 A1 Nov. 20, 2025

(30) Foreign Application Priority Data

Jun. 28, 2022 (JP) ................................ 2022-103605
Jun. 28, 2022 (JP) ................................ 2022-103606

(51) Int. Cl.
*H01G 9/02* (2006.01)
*H01G 9/00* (2006.01)
(Continued)

(52) U.S. Cl.
CPC ............ *H01G 9/02* (2013.01); *H01G 9/0036* (2013.01); *H01G 9/028* (2013.01); *H01G 9/035* (2013.01);
(Continued)

(58) Field of Classification Search
CPC .......... H01G 9/00; H01G 9/0036; H01G 9/02; H01G 9/028; H01G 9/035; H01G 9/048; H01G 9/145; H01G 9/15; H01G 9/151
See application file for complete search history.

(56) References Cited

U.S. PATENT DOCUMENTS 10,777,361 B2 9/2020 Toader et al.
2016/0172117 A1* 6/2016 Kubo .................... H01G 9/151
29/25.03

(Continued)

FOREIGN PATENT DOCUMENTS

JP 2011091547 A 5/2011
JP 2014040550 A 3/2014

(Continued)

OTHER PUBLICATIONS

WO-2024116845-A1 Machine Translation (Year: 2024).*

(Continued)

*Primary Examiner* — Nathan Milakovich
(74) *Attorney, Agent, or Firm* — Law Office of Katsuhiro Arai

(57) ABSTRACT

A solid electrolytic capacitor includes a capacitor element in which a first separator, an anode foil connected to an extraction lead terminal and having an anodized film on a surface thereof, a second separator, and a cathode foil connected to an extraction lead terminal are sequentially disposed and in which a conductive polymer is formed, wherein the first separator and the second separator project from the anode foil in a planar direction and face each other in a manner of each having the conductive polymer, wherein the first separator and the second separator are at least partially fixed in a manner of being electrically connected by the conductive polymer, forming an adhesion part thereat.

40 Claims, 16 Drawing Sheets

(51) Int. Cl.

| | |
|---|---|
| ***H01G 9/028*** | (2006.01) |
| ***H01G 9/035*** | (2006.01) |
| ***H01G 9/042*** | (2006.01) |
| ***H01G 9/045*** | (2006.01) |
| ***H01G 9/055*** | (2006.01) |
| ***H01G 9/15*** | (2006.01) |

(52) U.S. Cl.
CPC ........... *H01G 9/0425* (2013.01); *H01G 9/045* (2013.01); *H01G 9/055* (2013.01); *H01G 9/151* (2013.01)

(56) References Cited

U.S. PATENT DOCUMENTS

| | | | | |
|---|---|---|---|---|
| 2018/0047521 | A1 | 2/2018 | Tsuda | |
| 2018/0240601 | A1 | 8/2018 | Aoyama et al. | |
| 2021/0005394 | A1 | 1/2021 | Will et al. | |
| 2021/0257166 | A1 | 8/2021 | Kakuma | |
| 2022/0102082 | A1 | 3/2022 | Kubo et al. | |
| 2023/0274890 | A1 | 8/2023 | Ogawa et al. | |
| 2023/0326685 | A1 | 10/2023 | Takezawa et al. | |
| 2026/0179854 | A1 * | 6/2026 | Shimoyama ........... | H01G 9/028 |

FOREIGN PATENT DOCUMENTS

| | | | | |
|---|---|---|---|---|
| JP | 2014072381 | A | 4/2014 | |
| JP | 2015005724 | A | 1/2015 | |
| JP | 2021121037 | A | 8/2021 | |
| JP | 2021519513 | A | 8/2021 | |
| WO | 2017090241 | A1 | 6/2017 | |
| WO | 2020021679 | A1 | 1/2020 | |
| WO | 2020158780 | A1 | 8/2020 | |
| WO | 2021171611 | A1 | 9/2021 | |
| WO | 2022024772 | A1 | 2/2022 | |
| WO | WO-2024116845 | A1 * | 6/2024 | ............... H01G 9/00 |
| WO | WO-2025052792 | A1 * | 3/2025 | ............... H01G 9/02 |

OTHER PUBLICATIONS

WO-2025052792-A1 Machine Translation (Year: 2025).*

International Search Report (ISR) mailed Aug. 29, 2023, issued for International application No. PCT/JP2023/021737. (3 pages).

Written Opinion of the International Searching Authority, mailed on Aug. 29, 2023, for a counterpart International Application No. PCT/JP2023/021737 (7 pages) (Japanese).

Y. Honma et al., Low-Temperature Electrical Transport Measurements in Conductive Polymer PEDOT/PSS, Annual Report of High Field Laboratory for Superconducting Materials, Institute for Materials Research, Tohoku University, vol. 2012, pp. 115-116, Jun. 2013, obtained from the following URL: http://www.hflsm.imr.tohoku.ac.jp/files/0402-12H0407-nishizaki.pdf.

International Preliminary Report on Patentability, dated Dec. 18, 2024, for corresponding international application PCT/JP2023/021737 (1 page).

Notification of Transmittal of Copies of Translation of the International Preliminary Report on Patentability, mailed Jan. 9, 2025, for corresponding international application PCT/JP2023/021737 (1 page).

Written Opinion of the International Searching Authority, mailed on Aug. 29, 2023, for a counterpart International Application No. PCT/JP2023/021737 (8 pages) (English).

A Notice of Reasons for Refusal issued by the Japanese Patent Office, mailed Jul. 28, 2026, for Japanese counterpart application No. 2022-103605. (7 pages).

A Notice of Reasons for Refusal issued by the Japanese Patent Office, mailed Jul. 28, 2026, for Japanese counterpart application No. 2022-103606. (9 pages).

* cited by examiner

[FIG. 1]
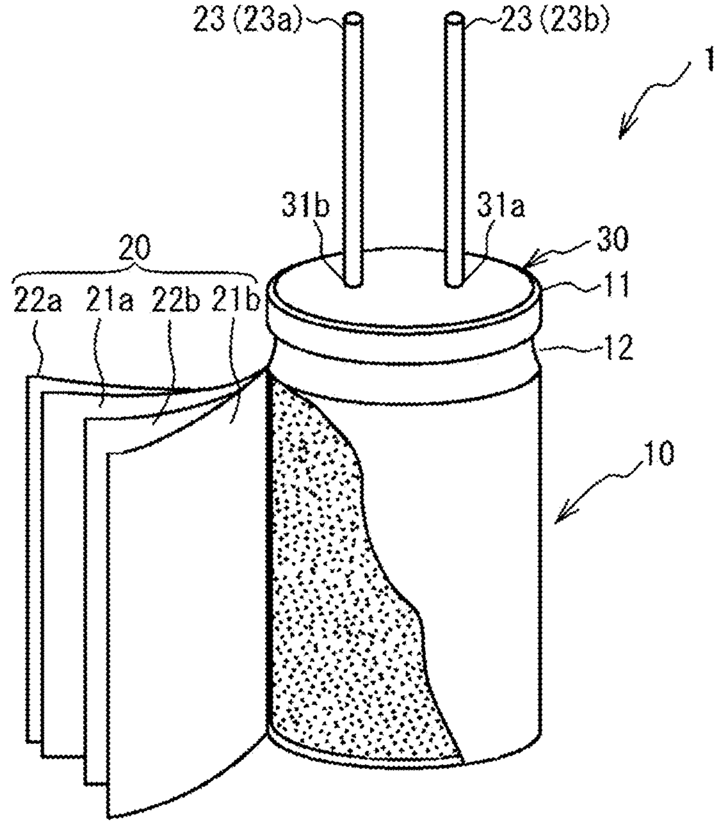

[FIG. 2]
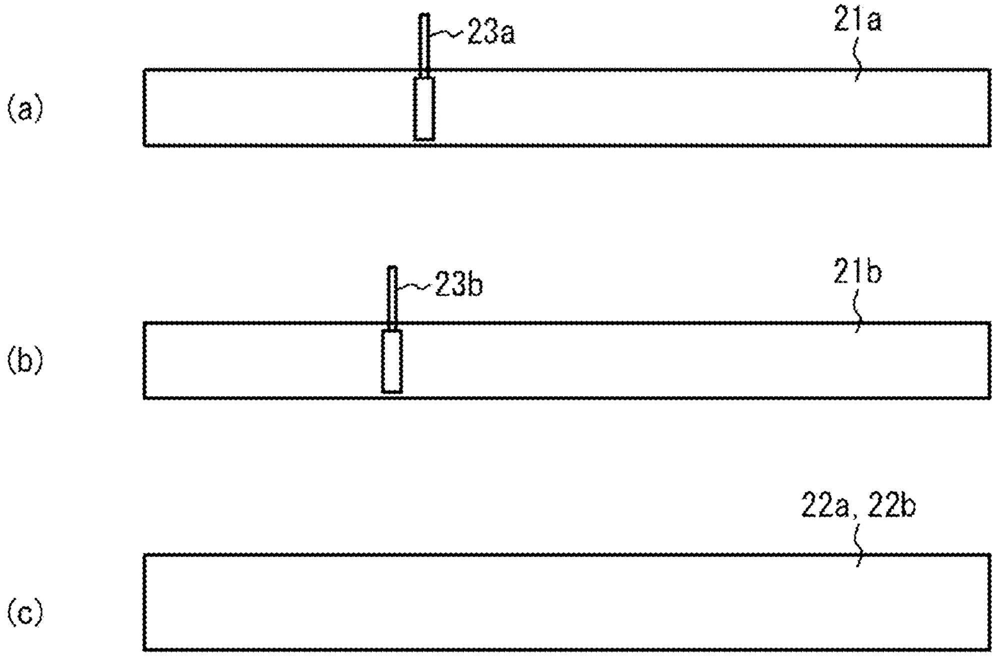
[FIG. 3]
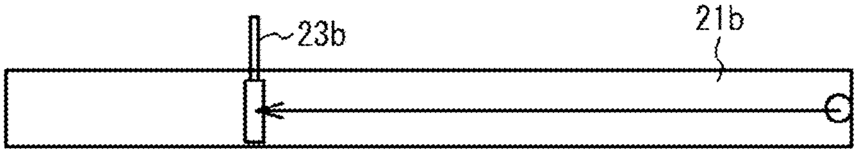

[FIG. 4]
(a)
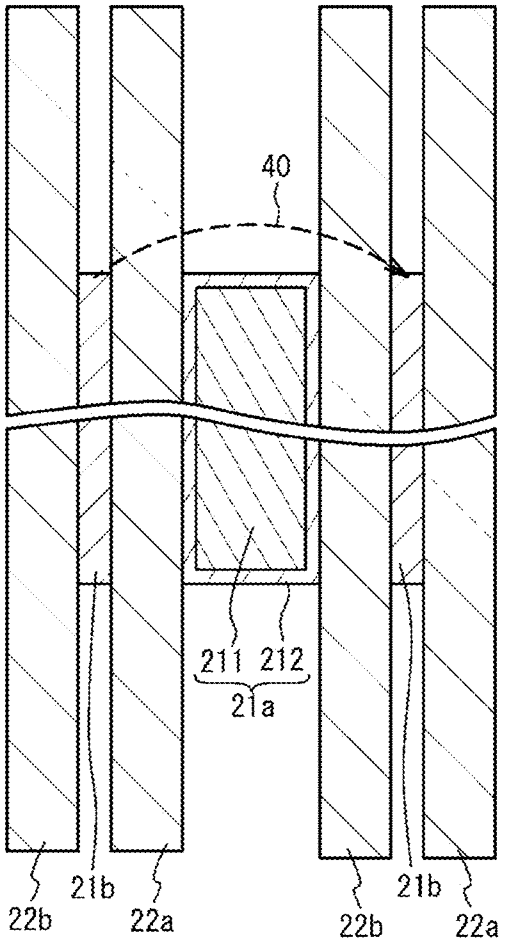
(b)
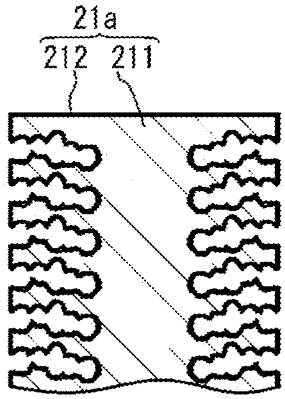

[FIG. 5]
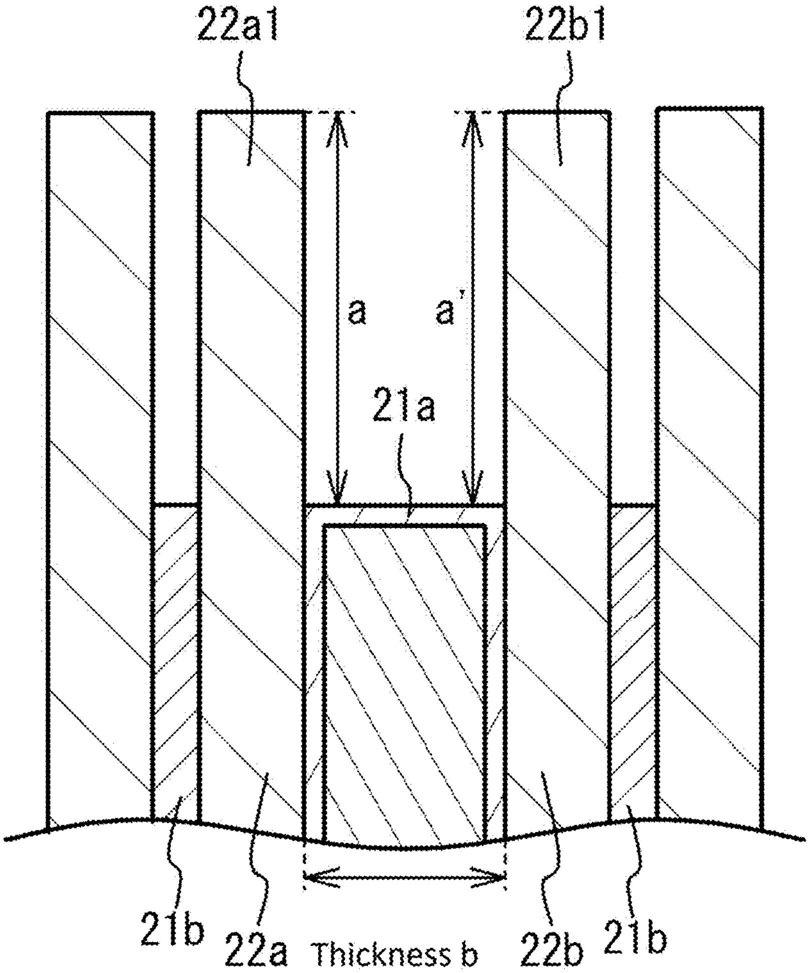

[FIG. 6]
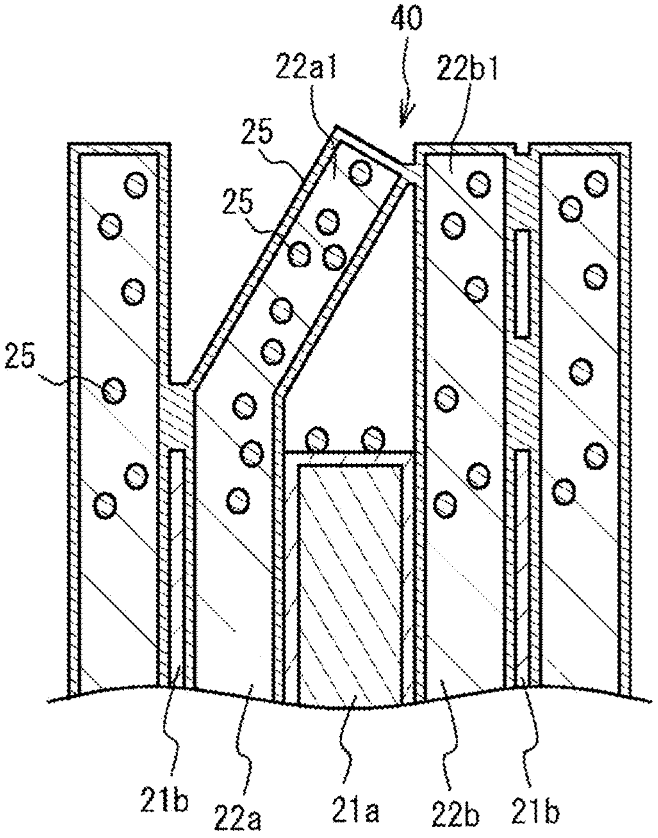

[FIG. 7]
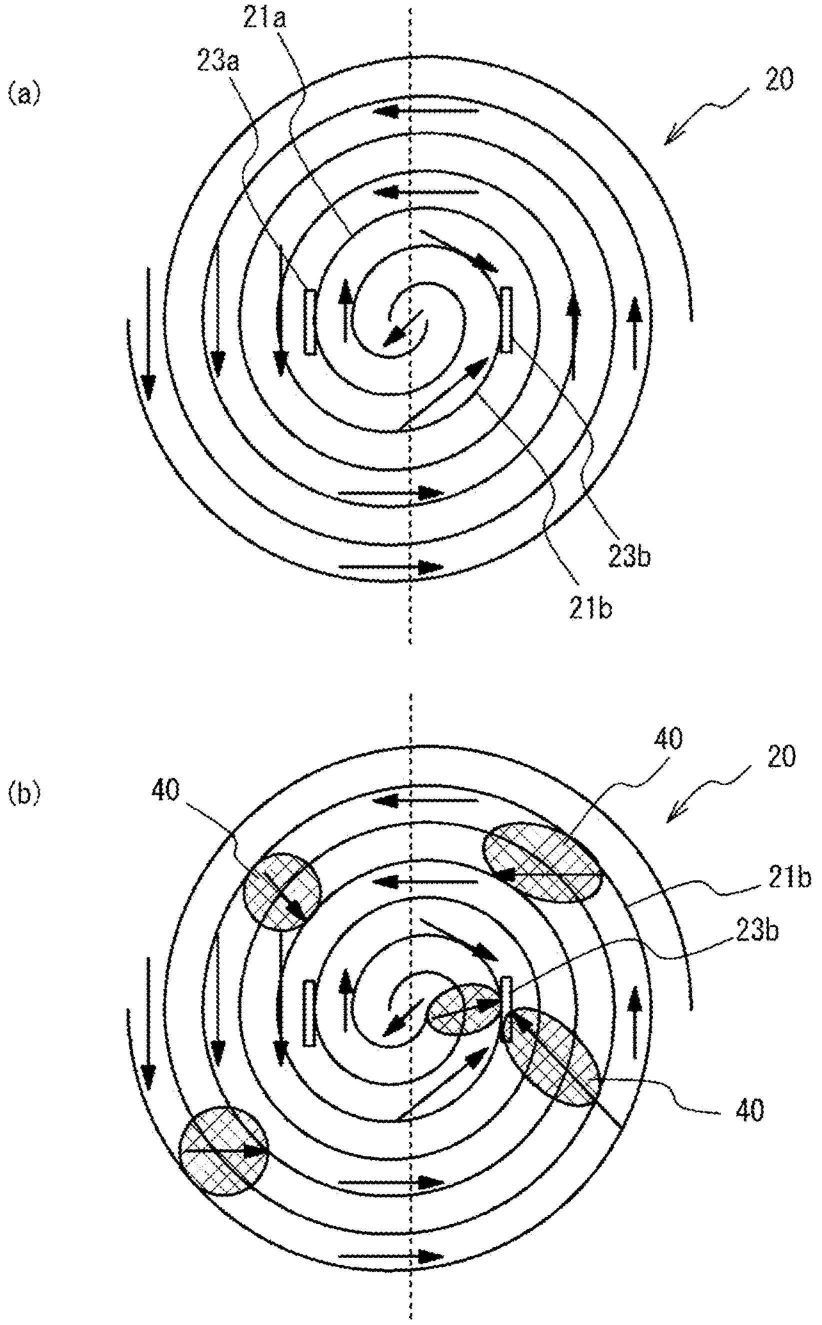

[FIG. 8]
(a)
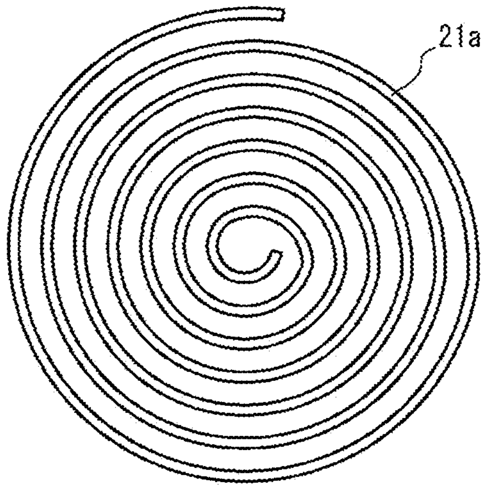
(b)
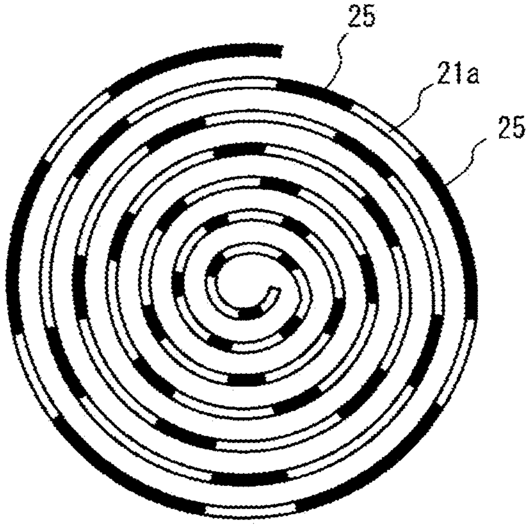

[FIG. 9]
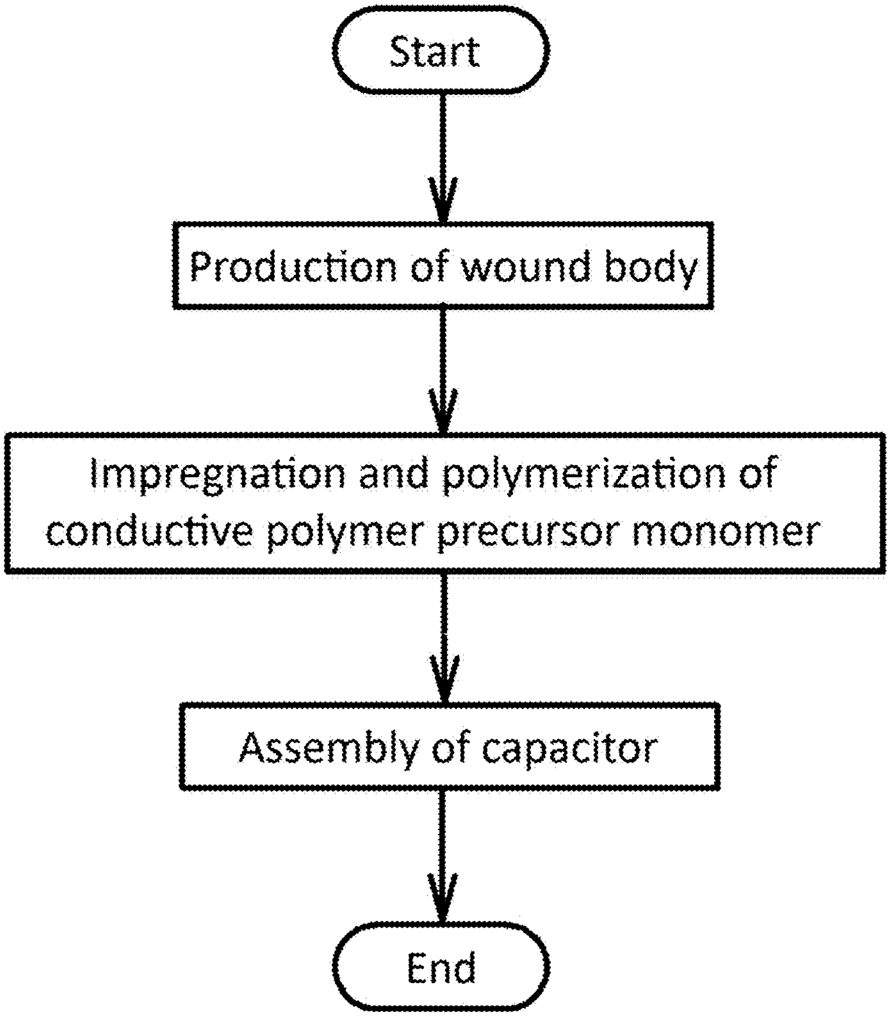

[FIG. 10]
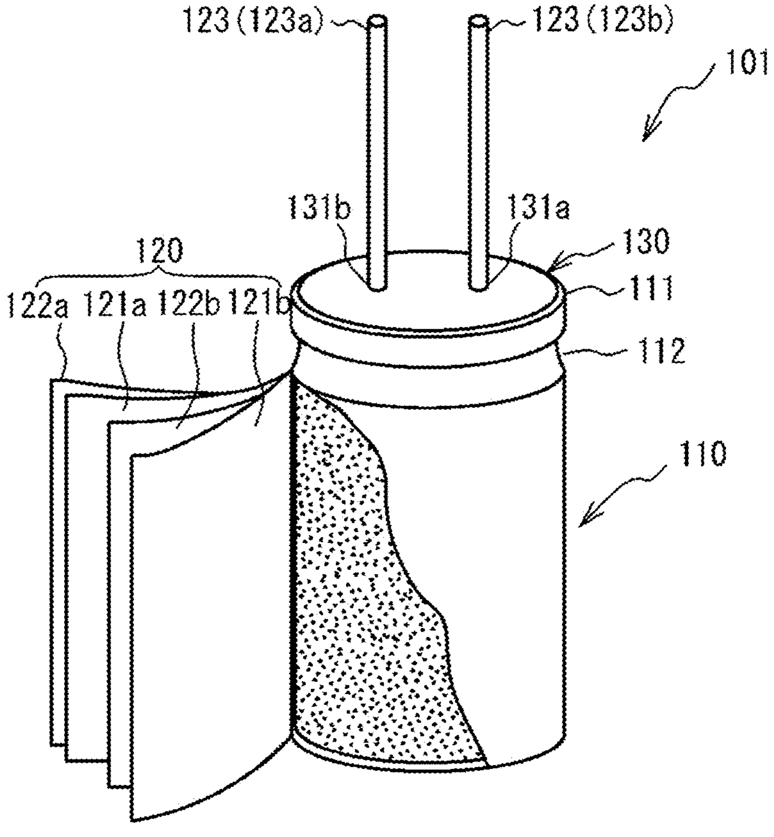

[FIG. 11]
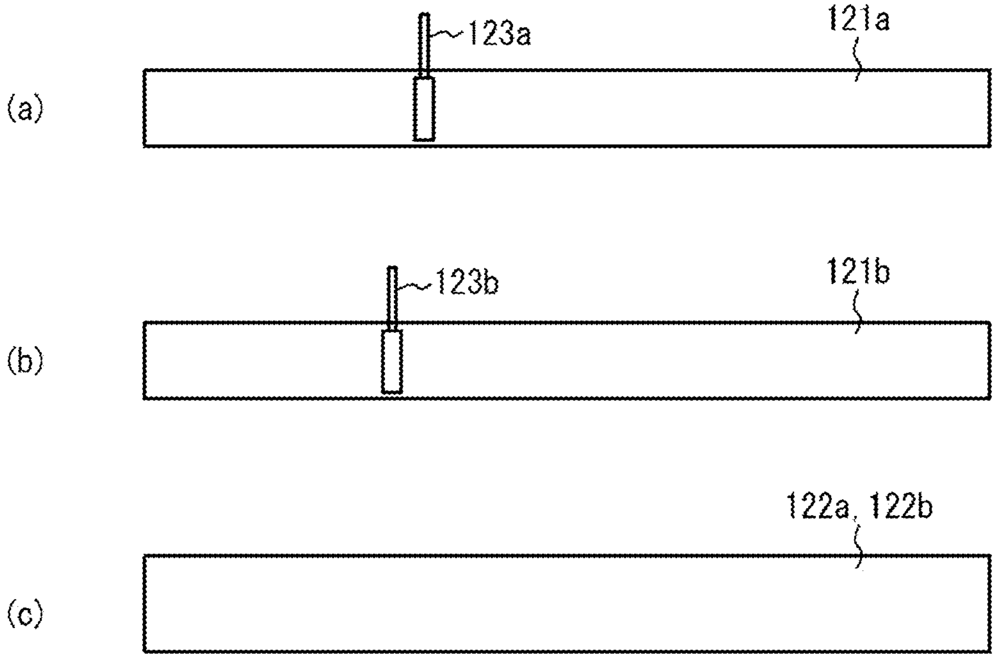
[FIG. 12]
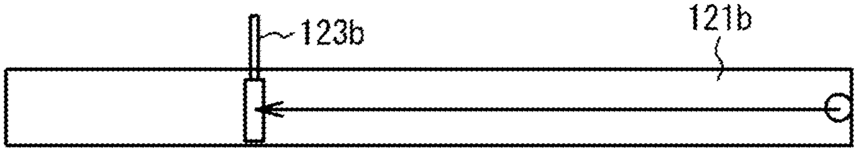

[FIG. 13]
(a)
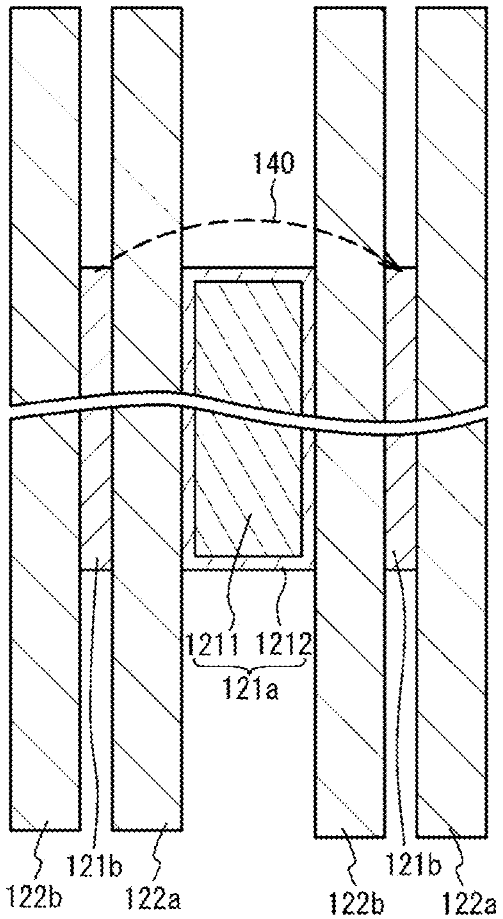
(b)
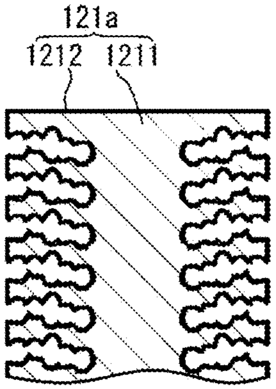

[FIG. 14]
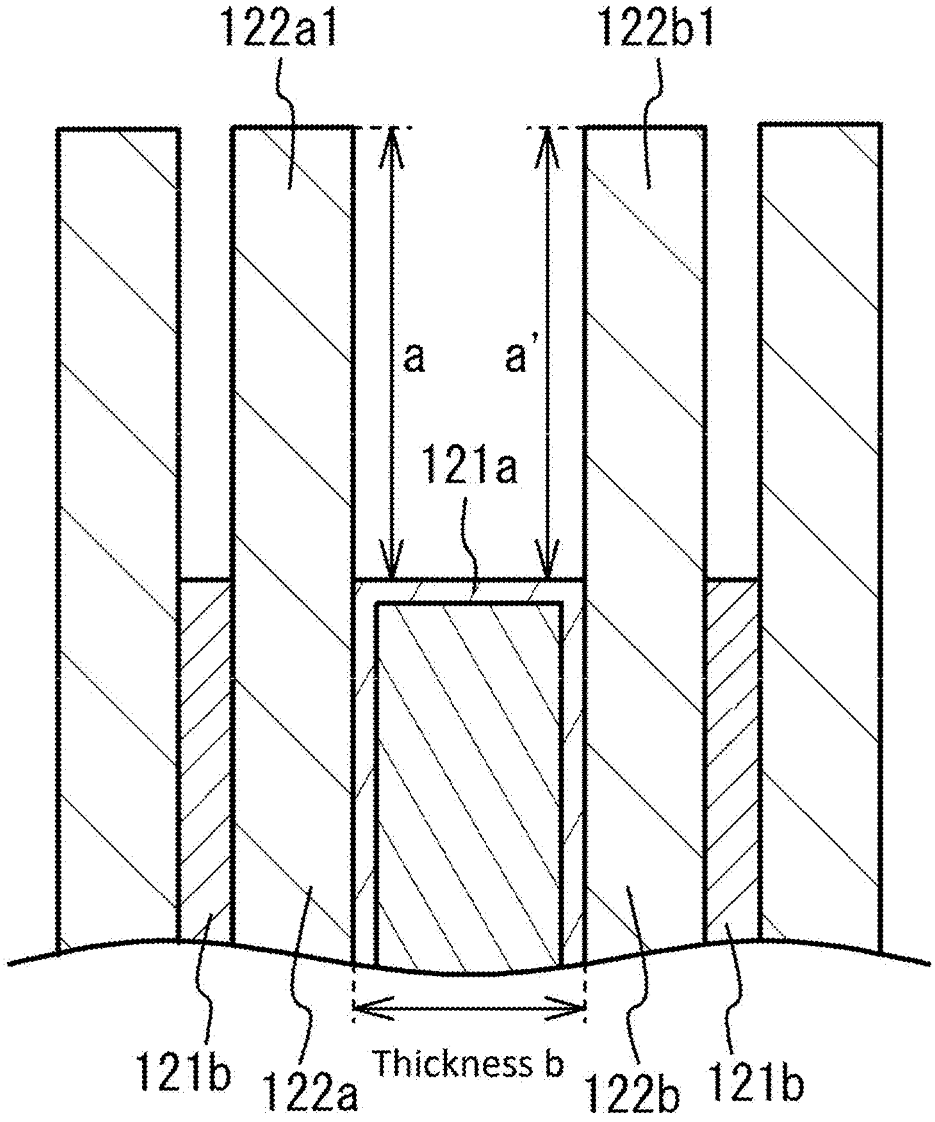

[FIG. 15]
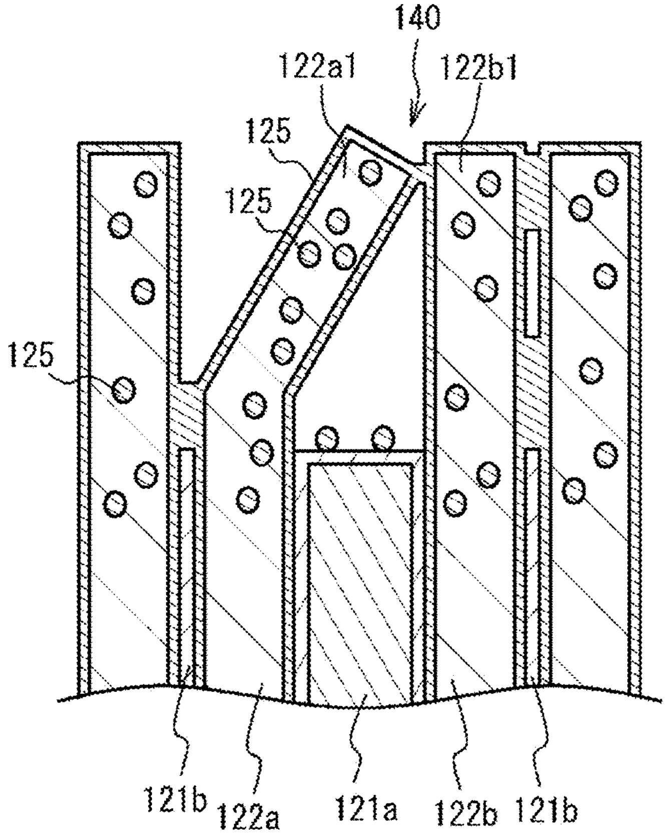

[FIG. 16]
(a)
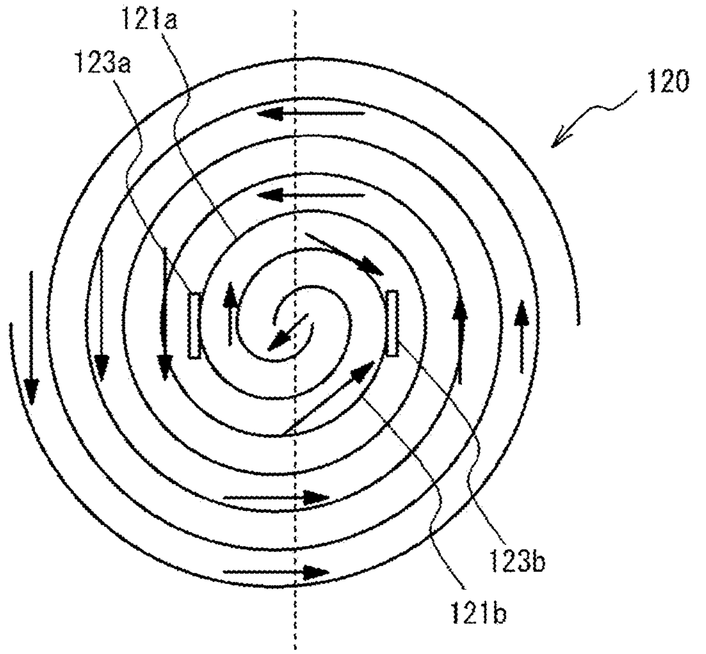
(b)
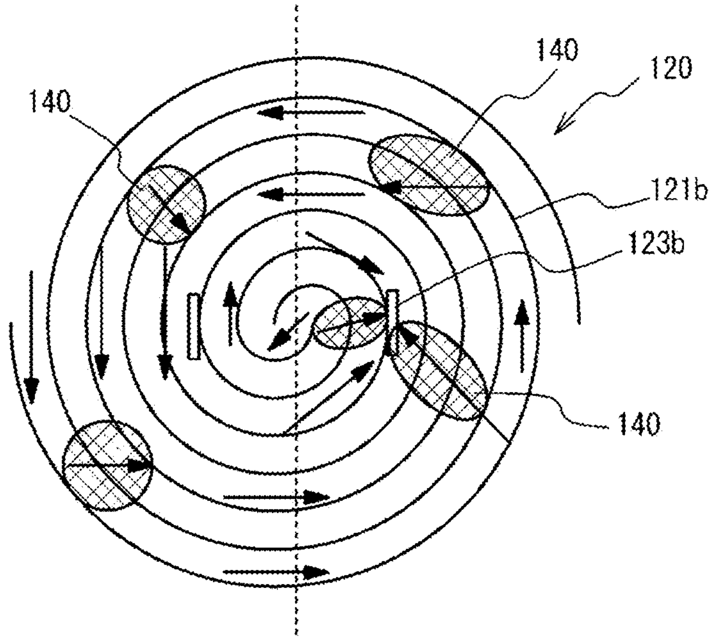

[FIG. 17]
(a)
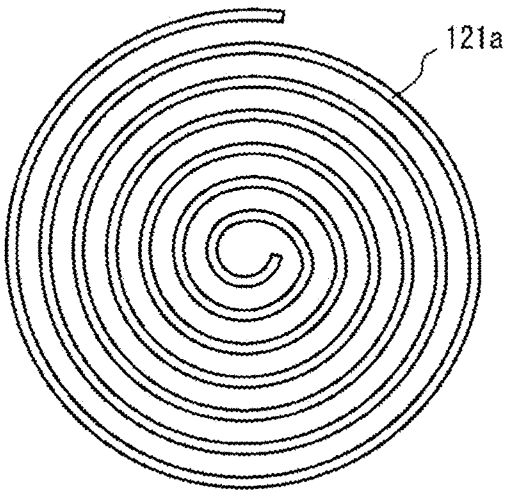
(b)
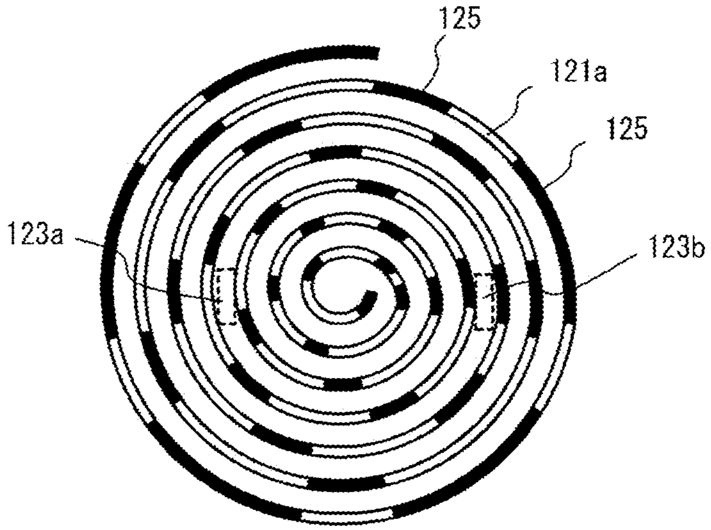

[FIG. 18]
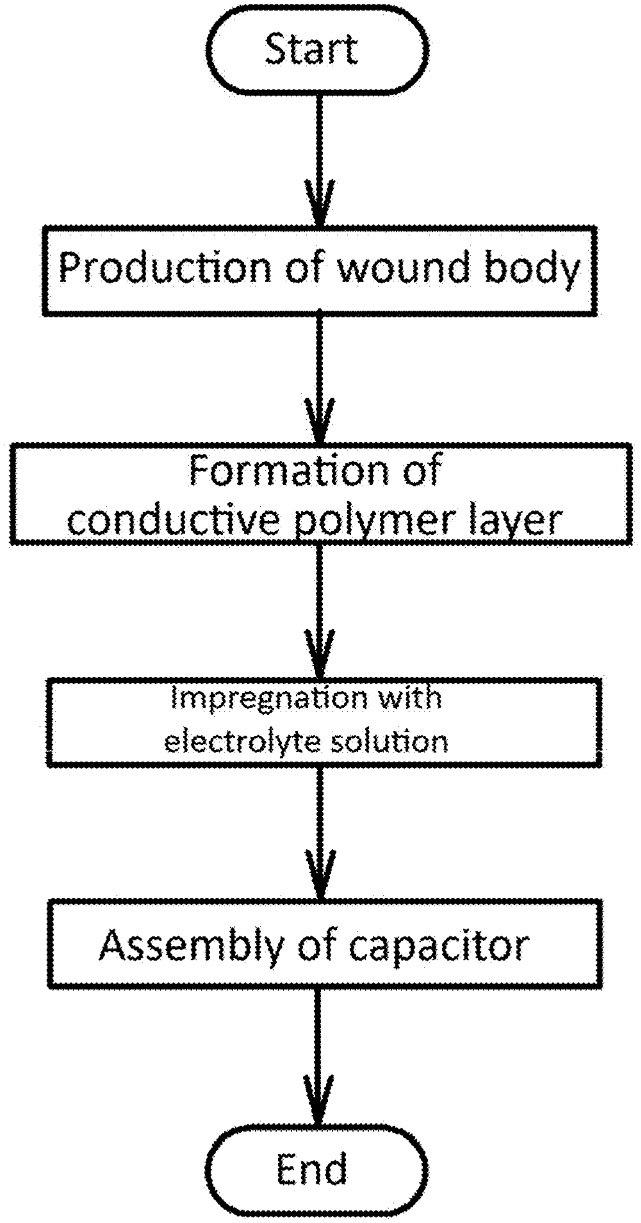

ELECTROLYTIC CAPACITOR AND METHOD FOR PRODUCING SAME

CROSS-REFERENCE TO RELATED APPLICATIONS

This application is the U.S. National Phase under 35 U.S.C. § 371 of International Application PCT/JP2023/021737, filed Jun. 12, 2023, which claims priority to Japanese Patent Application No. JP2022-103605, filed Jun. 28, 2022 and No. JP2022-103606, filed Jun. 28, 2022. The International Application was published under PCT Article 21 (2) in a language other than English.

TECHNICAL FIELD

The present invention relates to an electrolytic capacitor and a method for producing the same.

BACKGROUND ART

In a solid electrolytic capacitor using a valve metal foil, such as aluminum, the ESR (equivalent series resistance) is reduced by using, instead of an electrolyte solution for driving present in a typical electrolytic capacitor, a conductive polymer with an electrical conductivity much higher than that of the electrolyte solution for driving to form a solid electrolyte layer between both electrodes and by conducting the electrodes.

In general, in the solid electrolyte layer, an anode foil with an anodized film formed on a surface thereof and a cathode foil are wound so as to face each other via a separator, and a capacitor element with an extraction part, such as an extraction lead terminal, on both valve metal foils is impregnated with a monomer and is then solidified by polymerization or the like between both foils.

For example, 3,4-dialkoxythiophene is used as a monomer, an acetylenic glycol surfactant is added thereto, an appropriate amount of a polymerization initiator, such as iron toluenesulfonate, is added thereto, and the 3,4-dialkoxythiophene is polymerized by heating. Furthermore, the polymerized 3,4-dialkoxythiophene is doped with a separately polymerized polyanion to form a conductive polymer layer with a reduced surface resistivity, which is used as a solid electrolyte layer (see, for example, Patent Literature 1).

It is possible to form a separator layer including a high-density solid electrolyte layer composed of a conductive polymer by devising a material of a separator to increase the porosity of the separator, impregnating voids of the separator with a liquid composition as a precursor of the conductive polymer, and drying or polymerizing the liquid composition of the conductive polymer while being retained inside (see, for example, Patent Literature 2).

On the other hand, as a technique of an aluminum electrolytic capacitor for the purpose of reducing the ESR of a product, a technique has also been developed in which a metal plate is connected (bundled) to an end surface of a cathode foil with a conductive adhesive at an end surface of an aluminum electrolytic capacitor element, and the projecting cathode foils are electrically connected to each other directly via the bundle beyond an end surface of an anode foil (see, for example, Patent Literature 3).

Furthermore, as an electrolytic capacitor with a small size, a large capacity, and a low ESR (equivalent series resistance), an electrolytic capacitor including an anode foil on which a dielectric layer is formed, a conductive polymer layer with a high electrical conductivity formed so as to cover at least part of the dielectric layer, and an electrolyte solution with an ability to repair an anodized film (a solution composed of at least a solute and a solvent, having an ability to repair an anodized film, and having electrical conductivity) is referred to as a hybrid electrolytic capacitor and is considered to be promising as an electronic component for a vehicle-mounted article. For example, Patent Literature 4 describes a method for producing an aluminum electrolytic capacitor including impregnating a capacitor element with a dispersion containing a conductive polymer, a polymer dopant, a base component, and a solvent, and then partially removing the solvent to form a conductive polymer layer.

Background Art Literature

Patent Literature

[Patent Literature 1]: Japanese Unexamined Patent Application Publication No. 2014-40550
[Patent Literature 2]: Japanese Unexamined Patent Application Publication No. 2011-91457
[Patent Literature 3]: Japanese Unexamined Patent Application Publication No. 2021-519513
[Patent Literature 4]: International Publication No. WO 2017/090241

SUMMARY OF INVENTION

Problems to be Solved by the Invention

In an electrolytic capacitor with a low ESR, when an electric current flows through an electrode foil, electrical resistance becomes a problem. Thus, in a capacitor element, there has been a problem of resistance applied to an electric charge flowing through an electrode foil to an extraction part, such as a lead terminal, due to the distance from a foil longitudinal end of the electrode foil to the extraction part.

Thus, it has been devised to form a metal bundle on an end surface of an element, as described in Patent Literature 3. However, the bundle itself is made of metal and may damage a dielectric surface of an anode foil during its formation, and it is therefore necessary to process the element surface. Furthermore, there was a problem such as, with the bundle connection, the maintenance of insulation between anode and cathode foils is complicated, and the cost is increased.

The present invention has been made in view of the above problems and aims to provide an electrolytic capacitor that can achieve a sufficiently low ESR, and a method for producing the same.

Means for Solving the Problems

An electrolytic capacitor according to the present invention is characterized by comprising a capacitor element in which a first separator, an anode foil connected to an extraction lead terminal and having an anodized film on a surface thereof, a second separator, and a cathode foil connected to an extraction lead terminal are sequentially disposed and in which a conductive polymer is formed, wherein the first separator and the second separator project from the anode foil in a planar direction and face each other in a manner of each having the conductive polymer, wherein the first separator and the second separator are at least partially fixed in a manner of being electrically connected by the conductive polymer, forming an adhesion part thereat.

In the electrolytic capacitor, the adhesion part may be an electrical shortcut path of the cathode foil.

In the electrolytic capacitor, the first separator and the second separator may have projecting parts that project from the anode foil in a planar direction and face each other and that contain the conductive polymer, a relationship of length a+length a'≥thickness b may be satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the conductive polymer may fix at least part of the projecting part of the first separator and at least part of the projecting part of the second separator.

In the electrolytic capacitor, each of the length a and the length a' may be 0.2 mm or more.

In the electrolytic capacitor, the first separator, the anode foil, the second separator, and the cathode foil may be wound together and have a roughly columnar shape, and the extraction lead terminal connected to the anode foil and the extraction lead terminal connected to the cathode foil may be provided on a first bottom face of the roughly columnar shape with the first bottom face and a second bottom face.

In the electrolytic capacitor, the anode foil may be an aluminum foil or an aluminum alloy foil, and the cathode foil may be a valve metal foil, an alloy foil of a valve metal, or a foil in which a conductive layer is formed on a surface of a valve metal.

In the electrolytic capacitor, a projection length of the projecting parts of the first separator and the second separator on the first bottom face are greater than a projection length of the projecting parts of the first separator and the second separator on the second bottom face.

In the adhesion part of the electrolytic capacitor, at least one of the first separator and the second separator may be inclined with respect to a cylindrical axis of the capacitor element.

In the electrolytic capacitor, the capacitor element may contain water inside.

In the electrolytic capacitor, the total of an area covered with the conductive polymer in an exposed portion of the anode foil on the first bottom face and an area covered with the conductive polymer in an exposed portion of the anode foil on the second bottom face may be 48% or more of the total area of the exposed portions of the anode foil on the first bottom face and the second bottom face.

In the electrolytic capacitor, an area covered with the conductive polymer in the exposed portion of the anode foil on the first bottom face may be 45% or more of the area of the exposed portion of the anode foil on the first bottom face.

In the electrolytic capacitor, in at least one of the first bottom face and the second bottom face, the area of the exposed portion of the anode foil covered with the conductive polymer may increase from a central portion to the periphery thereof.

In an axial direction of the roughly columnar shape of the electrolytic capacitor, the amount of electrolyte solution per unit area of the first separator and the second separator may be larger on the first bottom face side and the second bottom face side than on a central side.

In the electrolytic capacitor, the conductive polymer layer may be formed by polymerizing a precursor monomer.

In the electrolytic capacitor, the first separator and the second separator may be at least one selected from cellulose, rayon, and glass fiber.

In a plan view of the capacitor element of the electrolytic capacitor, the adhesion part may be formed at least in a half region on a side where the lead terminal connected to the cathode foil is located.

In the electrolytic capacitor, the capacitor element may be impregnated with an electrolyte solution, the first separator and the second separator may have projecting parts that project from the anode foil and the cathode foil in a planar direction and face each other and contain the conductive polymer, a relationship of length a+length a'≥thickness b may be satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the conductive polymer may bind at least part of the projecting part of the first separator and at least part of the projecting part of the second separator to form an adhesion part.

In the electrolytic capacitor, the adhesion part may contain and be swollen with the electrolyte solution, may be in a wet state, and may have stickiness.

In the electrolytic capacitor, the adhesion part may have a structure that allows electrical connection through a shortcut path of the cathode foil, and may contain and be swollen with the electrolyte solution, may be in a wet state, and may have stickiness so that, between the first separator and the second separator, connected are the separators to each other, the conductive polymers to each other, or the separator and the conductive polymer.

In the electrolytic capacitor, each of the length a and the length a' may be 0.2 mm or more.

In the electrolytic capacitor, the first separator, the anode foil, the second separator, and the cathode foil may be sequentially stacked, wound together, and have a roughly columnar shape, and the extraction lead terminal connected to the anode foil and the extraction lead terminal connected to the cathode foil may be provided on a first bottom face of the roughly columnar shape with the first bottom face and a second bottom face.

In the electrolytic capacitor, the total of an area covered with the conductive polymer on an end surface of the anode foil on the first bottom face and an area covered with the conductive polymer on an end surface of the anode foil on the second bottom face may be 20% or more of the total area of the end surfaces of the anode foil on the first bottom face and the second bottom face.

In the electrolytic capacitor, an area covered with the conductive polymer on an end surface of the anode foil on the first bottom face may be 15% or more of the area of the end surface of the anode foil on the first bottom face.

In the electrolytic capacitor, in an end surface of the anode foil on at least one of the first bottom face and the second bottom face, the area covered with the conductive polymer may increase from a central portion to the periphery thereof.

In the electrolytic capacitor, in an axial direction of the capacitor element with the roughly columnar shape, the amount of electrolyte solution per unit area of the first separator and the second separator may be larger on the first bottom face side and the second bottom face side than on a central side.

In the electrolytic capacitor, the conductive polymer layer may be formed from a conductive polymer dispersion liquid with a polymer concentration of 0.5% by weight or more or a viscosity of 10 mPa·s or more.

In the electrolytic capacitor, the first separator and the second separator may be one of cellulose, rayon, and glass fiber, or mixed paper containing the foregoing.

In the electrolytic capacitor, in a plan view of the capacitor element, the adhesion part may be formed at least in one of half regions on a side where the lead terminal connected to the cathode foil is located.

In the electrolytic capacitor, the adhesion part may swell when the capacitor element is impregnated with the electrolyte solution and may have stickiness in a wet state.

A method for producing an electrolytic capacitor according to the present invention is characterized by including: in a capacitor element in which a first separator, an anode foil connected to an extraction lead terminal and having an anodized film on a surface thereof, a second separator, and a cathode foil connected to an extraction lead terminal are sequentially disposed and in which the first separator and the second separator project from the anode foil in a planar direction and face each other, impregnating the first separator and the second separator with a precursor monomer to form a conductive polymer in the capacitor element, and fixing at least partially the first separator and the second separator in a manner of being electrically connected by the conductive polymer, thereby forming an adhesion part.

In the method for producing an electrolytic capacitor, the first separator and the second separator may have projecting parts that project from the anode foil in a planar direction and face each other and that contain the conductive polymer, a relationship of length a+length a'≥thickness b may be satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the adhesion part may be formed between the projecting parts of the first separator and the second separator.

In the method for producing an electrolytic capacitor, when a step of impregnating the capacitor element with the precursor monomer and polymerizing the precursor monomer is repeated once or multiple times to form a solid electrolyte layer, the projecting parts of the first separator and the second separator may also be simultaneously fixed, thereby forming an adhesion part.

The method for producing an electrolytic capacitor may include, to adjust a surface coverage of the adhesion part of the projecting parts of the first separator and the second separator, impregnating or attaching the conductive polymer to the first separator and the second separator again, thereby forming a solid electrolyte layer so as to increase a portion of adhesion.

In the method for producing an electrolytic capacitor, a relationship of length a+length a'≥thickness b may be satisfied in the capacitor element, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the method may include: a step of impregnating the projecting parts of the first separator and the second separator with the conductive polymer and removing water, thereby forming an adhesion part between the projecting parts of the first separator and the second separator, wherein connected via a shortcut path are the cathode foils to each other, or the separator and the cathode foil; and a step of impregnating the capacitor element with an electrolyte solution to swell the conductive polymer forming the adhesion part into a wet state with stickiness.

The method for producing an electrolytic capacitor may include removing the water by drying.

The method for producing an electrolytic capacitor may include, when the capacitor element is impregnated with the electrolyte solution, injecting the electrolyte solution into the conductive polymer to swell the conductive polymer forming the adhesion part into a wet state with stickiness.

The method for producing an electrolytic capacitor may include, at the time of impregnation with the conductive polymer, mixing a dispersion liquid of the conductive polymer with a solute, removing water, and using the dispersion liquid of the conductive polymer as the electrolyte solution to impregnate the capacitor element with the electrolyte solution and to swell the conductive polymer forming the adhesion part into a wet state with stickiness.

The method for producing an electrolytic capacitor may include, when a dispersion liquid of the conductive polymer is used as the electrolyte solution, further injecting the electrolyte solution into the capacitor element.

The method for producing an electrolytic capacitor may include, when a dispersion liquid of the conductive polymer is used as the electrolyte solution, using one or more solutions selected from water and an organic solvent as a solvent of the dispersion liquid of the conductive polymer.

In the method for producing an electrolytic capacitor, the organic solvent may be selected from at least one of a glycol-based compound, a lactone-based compound, and a sulfolane each having a boiling point of 150° C. or more, and a weight ratio of the organic solvent to water may range from 1:99 to 50:50.

Effects of the Invention

The present invention can provide an electrolytic capacitor that can achieve a sufficiently low ESR, and a method for producing the same.

BRIEF DESCRIPTION OF THE DRAWINGS

FIG. 1 is a schematic view of an electrolytic capacitor according to a first embodiment.

FIG. 2(*a*) is a developed view of an anode foil expanded in a sheet shape, (b) is a developed view of a cathode foil expanded in a sheet shape, and (c) is a developed view of a first separator expanded in a sheet shape.

FIG. 3 is a developed view of a cathode foil expanded in a sheet shape.

FIG. 4(*a*) is a schematic cross-sectional view for explaining a laminate structure in a capacitor element, and (b) is an enlarged cross-sectional view of an anode foil.

FIG. 5 is an explanatory view of a configuration for forming an adhesion part on two cathode foils sandwiching an anode foil.

FIG. 6 is a view illustrating a state in which projecting parts are in contact with each other with an anode foil interposed therebetween.

FIGS. 7(*a*) and (*b*) are views for explaining an effect in a case where an adhesion part is formed in the radial direction on an upper surface of a capacitor element.

FIG. 8(*a*) is a view illustrating an image of an upper surface of a capacitor element before formation of a conductive polymer, and (b) is a view illustrating an image of the upper surface of the capacitor element after formation of the conductive polymer.

FIG. 9 is a diagram illustrating a flow of a method for producing an electrolytic capacitor 1.

FIG. 10 is a schematic view of an electrolytic capacitor according to a second embodiment.

FIG. 11(*a*) is a developed view of an anode foil expanded in a sheet shape, (b) is a developed view of a cathode foil expanded in a sheet shape, and (c) is a developed view of a first separator expanded in a sheet shape.

FIG. 12 is a developed view of a cathode foil expanded in a sheet shape.

FIG. 13(*a*) is a schematic cross-sectional view for explaining a laminate structure in a capacitor element, and (b) is an enlarged cross-sectional view of an anode foil.

FIG. 14 is an explanatory view of a configuration for forming an adhesion part on two cathode foils sandwiching an anode foil.

FIG. 15 is a view illustrating a state in which projecting parts are in contact with each other with an anode foil interposed therebetween.

FIGS. 16(*a*) and (*b*) are views for explaining an effect in a case where an adhesion part is formed in the radial direction on an upper surface of a capacitor element.

FIG. 17(*a*) is a view illustrating an image of an upper surface of a capacitor element before formation of a conductive polymer, and (b) is a view illustrating an image of the upper surface of the capacitor element after formation of the conductive polymer.

FIG. 18 is a diagram illustrating a flow of a method for producing an electrolytic capacitor.

MODE FOR CARRYING OUT THE INVENTION

Embodiments are described below with reference to the accompanying drawings.

First Embodiment

FIG. 1 is a schematic view of a solid electrolytic capacitor 1 according to a first embodiment. The solid electrolytic capacitor 1 includes a metal case 10 functioning as an exterior body, a capacitor element 20 inserted in the metal case 10, and a sealing body 30.

The metal case 10 is a bottomed cylindrical aluminum case having an opening portion 11 at one end. In the present embodiment, the metal case 10 has a cylindrical shape as an example but may have a polygonal cylinder shape.

The capacitor element 20 includes a pair of electrode foils. The pair of electrode foils are an anode foil 21*a* and a cathode foil 21*b*. A first separator 22*a*, the anode foil 21*a*, a second separator 22*b*, and the cathode foil 21*b* are stacked in this order and wound in the length direction to constitute the capacitor element 20. The shape of the capacitor element 20 is approximately matched to the internal shape of the metal case 10. Thus, the capacitor element 20 has a columnar shape. The capacitor element 20 in the present embodiment is preferably used for a wound type (approximately cylindrical) in which an effect of a shortcut path in movement of ions can be well exhibited, but may be used for a multilayer capacitor element (approximately polygonal column) in which an anode foil and a cathode foil are sequentially stacked via a separator.

The anode foil 21*a* and the cathode foil 21*b* can be a valve metal, such as aluminum, tantalum, titanium, or niobium, an alloy foil thereof, a vapor-deposited film, or the like. The vapor-deposited film is, for example, a titanium vapor-deposited film. The cathode foil 21*b* may be a valve metal foil, an alloy foil of a valve metal, or a foil in which a conductive layer is formed on a surface of a valve metal. The anode foil 21*a* is entirely covered with an oxide film. Thus, the anode foil 21*a* is insulated from other members. This oxide film functions as a dielectric, and the capacitor element 20 therefore functions as a capacitor. No oxide film is formed on the surface of the cathode foil 21*b*. An inorganic layer or a carbon layer may be formed on the surface of the cathode foil 21*b*. In such a case, a conductive polymer 25 described later is also formed on the surface on which the inorganic layer or the carbon layer is formed.

An anode lead terminal 23*a* is connected to the anode foil 21*a* as an extraction lead terminal. A cathode lead terminal 23*b* is connected to the cathode foil 21*b* as an extraction lead terminal.

The sealing body 30 is a rubber sealing body with a pair of lead insertion holes 31*a* and 31*b* through which the anode lead terminal 23*a* and the cathode lead terminal 23*b* are inserted. The sealing body 30 is fitted into the opening portion 11 of the metal case 10 and is hermetically and firmly attached by a transversal throttling groove 12 formed along the outer periphery of the opening portion 11 by a caulking piece or the like. For example, butyl rubber or the like is used for the sealing body 30.

In the present embodiment, among the bottoms of the columnar shape of the capacitor element 20, the bottom on which the lead terminals are provided is referred to as an upper surface (first bottom face), and the bottom on which the lead terminals are not provided is referred to as a lower surface (second bottom face).

FIG. 2(*a*) is a developed view of the anode foil 21*a* expanded in a sheet shape. FIG. 2(*b*) is a developed view of the cathode foil 21*b* expanded in a sheet shape. As illustrated in FIGS. 2(*a*) and 2(*b*), the anode lead terminal 23*a* and the cathode lead terminal 23*b* have a structure in which a lead wire is connected to a tab terminal shaped like a hago-ita (a racket for traditional Japanese badminton), which is a flat sheet formed by pressing one end of a metal round bar, such as aluminum. The anode foil 21*a* and the cathode foil 21*b* are fixed to a flat portion of the tab terminal. It should be noted that the term "fix" means dry and solidify and is therefore different from "stick". FIG. 2(*c*) is a developed view of the first separator 22*a* expanded in a sheet shape. A conductive polymer is formed in the first separator 22*a*. No electrolyte solution is used in the solid electrolytic capacitor 1.

Although the first separator 22*a* has been described with reference to FIG. 2(*c*), the second separator 22*b* also has the same structure as the first separator 22*a*.

The first separator 22*a* and the second separator 22*b* are made of at least one material selected from cellulose, rayon, glass fiber, and the like.

The conductive polymer 25 is any polymer with electrical conductivity. For example, the conductive polymer 25 is, for example, at least one polymer selected from the group consisting of polythiophene, polypyrrole, polyaniline, and derivatives thereof. The conductive polymer 25 is typically polyethylenedioxythiophene (PEDOT) with at least one acid selected from the group consisting of p-toluenesulfonic acid, poly(styrene sulfonate) (PSS), and the like as a dopant.

The volume resistivity (Ωm) of the cathode foil 21*b* and the conductive polymer 25 is described below. For example, when aluminum is used as the cathode foil 21*b*, the cathode foil 21*b* has a volume resistivity of approximately $2.65\times10^{-6}$ Ωm. When PEDOT with PSS as a dopant is used as the conductive polymer 25, the conductive polymer 25 has a volume resistivity in the range of approximately $1.0\times10^{-3}$ to $1.0\times10^{-2}$.

The capacitor element 20 according to the present embodiment can have high electrostatic capacitance and low ESR due to the conductive polymer 25 in addition to the cathode foil 21*b*. However, the ESR is not sufficiently decreased in some cases. This is described in detail below.

FIG. 3 is a developed view of the cathode foil 21*b* expanded in a sheet shape as in FIG. 2(*b*). As illustrated in FIG. 3, electronic conduction occurs in the length direction of the cathode foil 21*b*, and the electronic conduction distance to the cathode lead terminal 23*b* may therefore be increased. For example, the distance tends to increase to a distance from a point P farthest from the cathode lead terminal 23*b* to the cathode lead terminal 23*b*. This, together with the cathode foil with a small thickness, may increase the electrical resistance from the point P to the cathode lead terminal 23*b* and insufficiently reduce the ESR.

In particular, a wound capacitor element has a long distance from an end of the foil to a lead terminal and, for winding, the lead terminal is closer to one end of the foil length, so that there is a problem that the electrical resistance further increases when an electric charge moves from an end of the foil farther from the lead terminal.

Furthermore, the use of a foil with a smaller thickness and a lower metal purity than the anode foil as a cathode increases the resistance when the metal foil is electrically connected.

Thus, the capacitor element 20 according to the present embodiment has a configuration that can sufficiently reduce the ESR. First, an adhesion part between cathode foils is described below. FIG. 4(*a*) is a schematic cross-sectional view for explaining a laminate structure in the capacitor element 20. As illustrated in FIG. 4(*a*), in the cross section, stack units of the first separator 22*a*, the anode foil 21*a*, the second separator 22*b*, and the cathode foil 21*b* are sequentially stacked. The cathode foil 21*b* appears to be located on the opposite side of the first separator 22*a* from the anode foil 21*a*.

The anode foil 21*a* has a structure in which an anodized film 212 is formed on a surface of a metal foil 211. The anodized film 212 functions as a dielectric. As illustrated in FIG. 4(*b*), the anode foil 21*a* is enlarged, for example, by etching, and the anodized film 212 is formed on the surface of the anode foil 21*a* by chemical conversion treatment. The anode foil with a surface enlarged by the etching has an infinite number of pores on the surface and has a very large surface area. The anodized film 212 with a thickness in the range of 10 to 100 nm is formed on the entire surface of the anode foil 21*a*. An electric charge from the cathode lead terminal 23*b* passes through the cathode foil 21*b* and charges the anodized film 212 via the conductive polymer of the first separator 22*a*. However, an electric charge from the cathode lead terminal 23*b* passes through the cathode foil 21*b* closer to the cathode lead terminal 23*b* in FIG. 4(*a*), then passes through the wound cathode foil 21*b*, and passes through the cathode foil 21*b* farther from the cathode lead terminal 23*b* in FIG. 4(*a*), and therefore must pass through a path with an adequate length to reach from the cathode foil 21*b* on the left side to the cathode foil 21*b* on the right side in FIG. 4(*a*). When an adhesion part 40 is formed by the conductive polymer in the separators between two cathode foils 21*b*, a shortcut can be formed in the path from the point P farthest from the cathode lead terminal 23*b* to the cathode lead terminal 23*b* described with reference to FIG. 3 and can reduce the ESR. More specifically, an electric charge from the cathode lead terminal 23*b* passes through the cathode foil 21*b* and charges the anodized film 212 via the conductive polymer. When an electric charge passes through the cathode foil 21*b*, if an adhesion part is formed as an electrical shortcut path by the conductive polymer between the first separator 22*a* and the second separator 22*b*, an electric charge from the cathode lead terminal 23*b* reaches the cathode foil 21*b* in the periphery farther from the cathode lead terminal 23*b* via the adhesion part in a shorter distance, so that the anodized film 212 in the periphery is efficiently charged from the cathode foil 21*b* in the periphery via the conductive polymer in the periphery. This increases the electrical conductivity to the anodized film 212 of the anode foil 21*a* in the periphery, that is, reduces the ESR as the characteristics of the entire element.

FIG. 5 is an explanatory view of a configuration for forming an adhesion part on two cathode foils 21*b* sandwiching the anode foil 21*a*. As illustrated in FIG. 5, in the capacitor element 20 according to the present embodiment, the first separator 22*a* and the second separator 22*b* project from the anode foil 21*a* in the planar direction and face each other. In the example of FIG. 5, the first separator 22*a* and the second separator 22*b* project upward from the anode foil 21*a* on the upper surface of the capacitor element 20.

A projecting part 22*al* of the first separator 22*a* projecting from the anode foil 21*a* has a projection length a. A projecting part 22*b*1 of the second separator 22*b* projecting from the anode foil 21*a* has a projection length a'. The anode foil 21*a* has a thickness b at a position where the projecting part 22*al* of the first separator 22*a* and the projecting part 22*b*1 of the second separator 22*b* face each other. In this case, a relationship of length a+length a'≥thickness b is satisfied.

The first separator 22*a* and the second separator 22*b* have flexibility and tend to be easily bent and folded. Thus, as illustrated in FIG. 6, the projecting part 22*al* and the projecting part 22*b*1 are likely to come into contact with each other with the anode foil 21*a* interposed therebetween. In such a case, the conductive polymer 25 of the first separator 22*a* and the conductive polymer 25 of the second separator 22*b* come into contact with each other and are electrically connected to each other. Thus, the adhesion part 40 is formed between the two cathode foils 21*b* sandwiching the anode foil 21*a*. This can reduce the ESR of the capacitor element 20. By storing the projecting part 22*al* and the projecting part 22*b*1 in a housing, thereby exerting stress, they can be further fixed. Thus, in the present embodiment, the adhesion part 40 is formed by fixing the projecting part 22*al* and the projecting part 22*b*1 via the conductive polymer 25. At least one of the projecting part 22*al* and the projecting part 22*b*1 is preferably inclined with respect to the cylindrical axis of the capacitor element 20. For example, at least one of the projecting part 22*al* and the projecting part 22*b*1 is preferably inclined toward the center of the capacitor element 20. The inclination can suppress the influence of an impact even when the fixed portion is vulnerable against the impact.

FIGS. 7(*a*) and 7(*b*) are views for explaining an effect in a case where an adhesion part is formed in the radial direction on the upper surface of the capacitor element 20. As illustrated in FIGS. 7(*a*) and 7(*b*), the anode lead terminal 23*a* and the cathode lead terminal 23*b* are seen on the upper surface of the capacitor element 20. The anode lead terminal 23*a* and the cathode lead terminal 23*b* are not seen on the lower surface of the capacitor element 20.

As illustrated in FIG. 7(*a*), if the adhesion part is not formed, the ion conduction path goes around multiple times before reaching the cathode lead terminal 23*b*. In contrast, as illustrated in FIG. 7(*b*), when the adhesion part 40 is formed on the upper surface of the capacitor element 20 in the radial direction, it is possible to repeatedly form shortcuts to shorten the path leading to the cathode lead terminal 23*b*. In the present embodiment, since the anodized film 212 with insulating properties is formed on the anode foil 21*a*, a short circuit does not occur even when the anode foil 21*a* comes into contact with the adhesion part 40.

From the perspective of facilitating contact between the projecting part 22*al* of the first separator 22*a* and the projecting part 22*b*1 of the second separator 22*b*, (length a+length a') is preferably larger than the thickness b, more preferably at least twice the thickness b.

Likewise, from the perspective of facilitating contact between the projecting part 22*al* of the first separator 22*a* and the projecting part 22*b*1 of the second separator 22*b*, each of the length a and the length a' is preferably 0.2 mm or more, more preferably 0.25 mm or more, still more preferably 0.3 mm or more. For example, the anode foil 21*a* and the cathode foil 21*b* have a width of 2.7 mm or more and 7.5 mm or less in the direction between the upper surface and the lower surface of the capacitor element 20. The first separator 22*a* and the second separator 22*b* have a width of 3.2 mm or more and 8.0 mm or less in the direction between the upper surface and the lower surface of the capacitor element 20.

Furthermore, the adhesion part 40 is preferably formed at a position close to the cathode lead terminal 23*b*. Thus, in a plan view of the capacitor element 20, the adhesion part 40 is preferably formed at least in a half region on the side where the cathode lead terminal 23*b* is located (a region on the right side of the dotted line in FIG. 7(*a*)) from the perspective of electrical efficiency in forming an electrical shortcut path on the cathode side.

When the first separator 22*a* and the second separator 22*b* are in contact with each other, the exposed portion (end surface) of the anode foil 21*a* on the upper surface side appears to be covered with the conductive polymer 25 when the capacitor element 20 is viewed from the upper surface side. The number of formed adhesion parts 40 increases with the ratio of the end surface of the anode foil 21*a* on the upper surface side covered with the conductive polymer 25 (anode end surface coverage). Thus, it is preferable to set a lower limit to the anode end surface coverage.

In the present embodiment, the anode end surface coverage of the anode foil 21*a* can be defined as an area covered with the conductive polymer 25 with respect to the exposed area of the anode foil 21*a* on the upper surface of the capacitor element 20 when the capacitor element 20 is viewed from the upper surface side. From the perspective of forming a sufficient amount of the adhesion part 40, the anode end surface coverage is preferably 45% or more, more preferably 69% or more, still more preferably 73% or more.

The anode end surface coverage of the anode foil 21*a* can be calculated by image processing of an image of the upper surface of the capacitor element 20 before the conductive polymer 25 is formed and an image of the upper surface of the capacitor element 20 after the conductive polymer 25 is formed. First, in an image of the upper surface of the capacitor element 20 before the conductive polymer 25 is formed as illustrated in FIG. 8(*a*), the area of the exposed portion (end surface) of the anode foil 21*a* before coverage can be calculated by subtracting the areas of the first separator 22*a*, the second separator 22*b*, and a central portion and the areas of the anode lead terminal 23*a*, the cathode lead terminal 23*b*, and the cathode foil 21*b* from the total area of the capacitor element 20. In a plan view of the upper surface of the element, the area of the central portion is defined as an area calculated using the formula $\pi r^2$, on the assumption that a circle with the longest diameter of the holes in the central portion is present in the central portion and that half of the longest diameter of the circle is the radius.

Next, in an image of the upper surface of the capacitor element 20 after the conductive polymer 25 is formed as illustrated in FIG. 8(*b*), the area of the exposed portion (end surface) of the anode foil 21*a* after coverage can be calculated by subtracting the areas of the first separator 22*a*, the second separator 22*b*, and a central portion, the areas of the anode lead terminal 23*a*, the cathode lead terminal 23*b*, and the cathode foil 21*b*, and the area covered in black with the conductive polymer 25 from the total area of the capacitor element 20.

The anode end surface coverage can be calculated by calculating {(area of exposed portion of anode foil 21*a* before coverage)−(area of exposed portion of anode foil 21*a* after coverage)}/(area of exposed portion of anode foil 21*a* before coverage)×100(%).

As illustrated in FIG. 7(*b*), on the upper surface of the capacitor element 20, the distance required for the cathode foil 21*b* to make one turn is longer in the periphery than in the central portion. Thus, on the upper surface of the capacitor element 20, the area of the exposed portion of the anode foil 21*a* covered with the conductive polymer 25 preferably increases from the central portion to the periphery. Here, an increase in the area of the exposed portion of the anode foil 21*a* covered with the conductive polymer 25 means at least one of an increase in the absolute value of the area and an increase in the ratio of the area of the conductive polymer 25 in one turn.

Although the structure on the upper surface of the capacitor element 20 has been described with reference to FIGS. 5 to 7(*b*), also on the lower surface, the first separator 22*a* may include the projecting part 22*al* projecting toward the lower surface side, and the second separator 22*b* may include the projecting part 22*b*1 projecting toward the lower surface side. Alternatively, only one of the upper surface and the lower surface of the capacitor element 20 may be provided with the projecting part 22*al* and the projecting part 22*b*1.

However, since the cathode lead terminal 23*b* is connected to the upper surface side of the capacitor element 20 in the cathode foil 21*b*, the adhesion part is preferably formed on the upper surface side of the capacitor element 20. Thus, the projecting part 22*al* and the projecting part 22*b*1 are preferably disposed on the upper surface of the capacitor element 20.

Furthermore, since a large number of adhesion parts are preferably formed on the upper surface side of the capacitor element 20, when the projecting part 22*al* and the projecting part 22*b*1 are provided on both the upper surface and the lower surface, the length a and the length a' on the upper surface side are preferably longer than the length a and the length a' on the lower surface side.

The ratio of the area covered with the conductive polymer 25 to the total of the area of the exposed portion of the anode foil 21*a* when the capacitor element 20 is viewed from the upper surface side and the area of the exposed portion of the anode foil 21*a* when the capacitor element 20 is viewed from the lower surface side is preferably 48% or more, more preferably 70% or more, still more preferably 73% or more. The ratio can also be defined as the average value of the anode end surface coverage on the upper surface side and the anode end surface coverage on the lower surface side of the capacitor element 20.

Next, a method for producing the electrolytic capacitor 1 is described below. FIG. 9 is a diagram illustrating a flow of a method for producing the electrolytic capacitor 1.

(Production of Wound Body)

The first separator 22*a*, the anode foil 21*a* to which the anode lead terminal 23*a* is connected, the second separator 22*b*, and the cathode foil 21*b* to which the cathode lead terminal 23*b* is connected are stacked in this order and wound, and the outer surface thereof is fixed with a winding tape to produce a wound body. At this time, the first separator 22*a* and the second separator 22*b* project from the anode foil 21*a* on the upper surface side and the lower surface side.

(Impregnation and Polymerization of Conductive Polymer)

Next, in a reduced-pressure atmosphere, the wound body is immersed in a precursor monomer containing water and an organic solvent for 20 minutes and is then pulled up from the precursor monomer. In this manner, the wound body can be impregnated with the precursor monomer. While making a residue of the precursor monomer remain in the wound body, an oxidizing agent is applied, thereby forming the adhesion part 40.

For example, the adhesion part 40 can be formed by impregnating the first separator 22*a* and the second separator with the precursor monomer to form a conductive polymer in the capacitor element 20 and then polymerizing the precursor monomer while making a residue of the precursor monomer remain.

Alternatively, the adhesion part 40 may be formed by impregnating the first separator 22*a* and the second separator 22*b* with the precursor monomer, removing a residue of the precursor monomer, and causing the oxidizing agent to act to cause a polymerization reaction, and then impregnating the first separator 22*a* and the second separator 22*b* with the precursor monomer again, removing a residue of the precursor monomer, and causing the oxidizing agent to act. This series of procedures can be performed multiple times to form a sufficient amount of the adhesion part 40. Water may remain in the capacitor element 20.

When the step of impregnating the capacitor element 20 with the precursor monomer and polymerizing the precursor monomer is performed once or multiple times to form a solid electrolyte layer, the projecting parts of the first separator 22*a* and the second separator 22*b* may also be simultaneously fixed, thereby forming the adhesion part 40. To adjust the surface coverage of the adhesion part 40 at the projecting parts of the first separator 22*a* and the second separator 22*b*, the portion of adhesion may be increased by forming a solid electrolyte layer by impregnating or attaching the conductive polymer to the first separator 22*a* and the second separator 22*b* again.

(Sealing of Capacitor Element)

Next, the wound body is sealed with the metal case 10 and the sealing body 30 to complete the electrolytic capacitor 1. Subsequently, an aging treatment may be performed while applying a rated voltage.

In the production method according to the present embodiment, the projecting part 22*al* and the projecting part 22*b*1 are likely to come into contact with each other with the anode foil 21*a* interposed therebetween, and the adhesion part 40 is formed between two cathode foils 21*b* sandwiching the anode foil 21*a*. This can reduce the ESR of the capacitor element 20. Furthermore, at the time of impregnation of the precursor monomer, allowing the oxidizing agent to act in a state in which a separator impregnated with the precursor monomer has stickiness and the separators with stickiness are bound to each other causes polymerization of the precursor monomer, thereby forming a strong conductive polymer layer integrated with the separators.

In the above embodiment, a stack unit of the first separator 22*a*, the anode foil 21*a*, the second separator 22*b*, and the cathode foil 21*b* stacked in this order is wound, but the present invention is not limited thereto. For example, a stack unit of the first separator 22*a*, the cathode foil 21*b*, the second separator 22*b*, and the anode foil 21*a* stacked in this order may be wound.

In the above embodiment, the capacitor element 20 has an approximately cylindrical shape, but the present invention is not limited thereto. For example, the capacitor element 20 may have another columnar shape, such as a polygonal column.

In the above embodiment, the capacitor element 20 is wound, but the present invention is not limited thereto. For example, a plurality of stack units including the first separator 22*a*, the anode foil 21*a*, the second separator 22*b*, and the cathode foil 21*b* may be stacked without being wound.

Second Embodiment

FIG. 10 is a schematic view of an electrolytic capacitor 101 according to a second embodiment. The electrolytic capacitor 101 includes a metal case 110 functioning as an exterior body, a capacitor element 120 inserted in the metal case 110, and a sealing body 130.

The metal case 110 is a bottomed cylindrical aluminum case having an opening portion 111 at one end. In the present embodiment, the metal case 110 has a cylindrical shape as an example but may have a polygonal cylinder shape.

The capacitor element 120 includes a pair of electrode foils. The pair of electrode foils are an anode foil 121*a* and a cathode foil 121*b*. A first separator 122*a*, the anode foil 121*a*, a second separator 122*b*, and the cathode foil 121*b* are stacked in this order and wound in the length direction to constitute the capacitor element 120. The shape of the capacitor element 120 is almost the same as the internal shape of the metal case 110.

Thus, the capacitor element 120 has a columnar shape. The capacitor element 120 in the present embodiment is preferably used for a wound type (approximately cylindrical) in which an effect of a shortcut path in movement of ions can be well exhibited, but may be used for a multilayer capacitor element (approximately polygonal column) in which one pair or a plurality of pairs of an anode foil and a cathode foil stacked with a separator interposed therebetween are prepared and sequentially stacked.

The anode foil 121*a* and the cathode foil 121*b* can be a valve metal, such as aluminum, tantalum, titanium, or niobium, an alloy foil thereof, a vapor-deposited foil, or the like. The anode foil 121*a* is entirely covered with an anodized film. Thus, the anode foil 121*a* is insulated from other members. This anodized film functions as a dielectric, and the capacitor element 120 therefore functions as a capacitor. An inorganic layer or a carbon layer may be formed on the surface of the cathode foil 121*b* by vapor deposition, coating, or the like. In such a case, a conductive polymer 125 described later is also formed on the surface on which the inorganic layer or the carbon layer is formed.

An anode lead terminal 123*a* is connected to the anode foil 121*a* as an extraction lead terminal. A cathode lead terminal 123*b* is connected to the cathode foil 121*b* as an extraction lead terminal.

The sealing body 130 is a rubber sealing body with a pair of lead insertion holes 131*a* and 131*b* through which the anode lead terminal 123*a* and the cathode lead terminal 123*b* are inserted. The sealing body 130 is fitted into the opening portion 111 of the metal case 110 and is hermetically and firmly attached by a transversal throttling groove 112 formed along the outer periphery of the opening portion 111 by a caulking piece or the like. For example, butyl rubber or the like with a low swelling ratio for a solvent of an electrolyte solution described later is used for the sealing body 130. When the electrolyte solution contains ethylene glycol, this can reduce the influence of impurities extracted by the ethylene glycol on the capacitor characteristics. More specifically, it is preferable to use butyl rubber with a swelling ratio of less than 0.4% by weight even when immersed in an ethylene glycol solvent at 125° C. for 2000 hours or more and with a swelling ratio of less than 2% by weight even when immersed in a γ-butyrolactone solvent for 2000 hours or more in the same manner.

In the present embodiment, among the bottoms of the columnar shape of the capacitor element 120, the bottom on which the lead terminals are provided is referred to as an upper surface (first bottom face), and the bottom on which the lead terminals are not provided is referred to as a lower surface (second bottom face).

FIG. 11(*a*) is a developed view of the anode foil 121*a* expanded in a sheet shape. FIG. 11(*b*) is a developed view of the cathode foil 121*b* expanded in a sheet shape. As illustrated in FIGS. 11(*a*) and 11(*b*), the anode lead terminal 123*a* and the cathode lead terminal 123*b* have a structure in which a lead wire is connected to a battledore-shaped tab terminal, which is a flat sheet formed by pressing one end of a metal round bar, such as aluminum. The anode foil 121*a* and the cathode foil 121*b* are connected to a flat portion of the tab terminal.

FIG. 11(*c*) is a developed view of the first separator 122*a* expanded in a sheet shape. The first separator 122*a* is impregnated with an electrolyte solution, and a conductive polymer is formed thereon.

Although the positions of the region impregnated with the electrolyte solution and the region impregnated with the conductive polymer in the first separator 122*a* are not particularly limited, for example, the first separator 122*a* is entirely impregnated with the electrolyte solution and the conductive polymer. However, in the axial direction between the upper surface and the lower surface of the capacitor element 120, the impregnation amount of the electrolyte solution on the upper surface side and the lower surface side may be larger than the impregnation amount of the electrolyte solution on the central side of the first separator 122*a*.

The conductive polymer 125 tends to be mainly impregnated into the end portion on the upper surface side and the end portion on the lower surface side of the capacitor element 120. Thus, in the axis between the upper surface and the lower surface of the capacitor element 120, the impregnation amount of the conductive polymer 125 on the upper surface side and the lower surface side may be larger than the impregnation amount of the conductive polymer 125 on the central side of the first separator 122*a*. Alternatively, the first separator 122*a* may not be impregnated with the conductive polymer 125 on the central side and may be impregnated with the conductive polymer 125 only on the upper surface side and the lower surface side.

Although the first separator 122*a* has been described with reference to FIG. 11(*c*), the second separator 122*b* also has the same structure as the first separator 122*a*.

In the present embodiment, an electrolyte solution 124 may contain a polyhydric alcohol, a sulfone compound, a lactone compound, a carbonate compound, a diether compound of a polyhydric alcohol, a monohydric alcohol, or the like. These may be used alone or in combination.

It is desirable that the polyhydric alcohol contains, for example, at least one of ethylene glycol, diethylene glycol, triethylene glycol, propylene glycol, butanediol, poly(alkylene glycol), and glycerin. The poly(alkylene glycol) is preferably poly(ethylene glycol) with an average molecular weight in the range of 200 to 1000 or poly(propylene glycol) with an average molecular weight in the range of 200 to 5000.

The lactone compound can be γ-butyrolactone, γ-valerolactone, or the like. The carbonate compound can be dimethyl carbonate, diethyl carbonate, ethyl methyl carbonate, ethylene carbonate, propylene carbonate, fluoroethylene carbonate, or the like as a solvent. In particular, it is desirable to use ethylene glycol, poly(alkylene glycol), Y-butyrolactone, or sulfolane.

The electrolyte solution 124 may contain a solute. The solute can be an acid component, a base component, a salt composed of an acid component and a base component, a nitro compound, a phenolic compound, or the like.

The acid component can be an organic acid, an inorganic acid, or a composite compound of an organic acid and an inorganic acid. The organic acid can be a carboxylic acid, such as phthalic acid, isophthalic acid, terephthalic acid, maleic acid, adipic acid, benzoic acid, 4-hydroxybenzoic acid, 1,6-decanedicarboxylic acid, 1,7-octanedicarboxylic acid, or azelaic acid, or the like. The inorganic acid can be boric acid, phosphoric acid, phosphorous acid, hypophosphorous acid, phosphate, phosphodiester, or the like.

The composite compound of an organic acid and an inorganic acid can be borodisalicylic acid, borodioxalic acid, borodiglycolic acid, or the like.

The base component can be a primary, secondary, or tertiary amine, a quaternary ammonium, a quaternized amidinium, or the like. The primary, secondary, or tertiary amine can be, for example, methylamine, dimethylamine, trimethylamine, ethylamine, diethylamine, triethylamine, ethylenediamine, N,N-diisopropylethylamine, tetramethylethylenediamine, hexamethylenediamine, or the like. The quaternary ammonium can be, for example, tetramethylammonium, triethylmethylammonium, tetraethylammonium, or the like. The quaternized amidinium can be, for example, ethyldimethylimidazolinium, tetramethylimidazolinium, or the like.

Furthermore, as an absorbent for hydrogen gas generated inside the capacitor, p-nitrobenzyl alcohol is suitable, and the addition amount thereof preferably ranges from 0.5% to 1.5% by weight in the electrolyte solution. This is because less than 0.5% by weight results in a small hydrogen gas absorption effect and, on the other hand, more than 1.5% by weight may result in a decrease in pressure resistance characteristics.

The first separator 122*a* and the second separator 122*b* are made of one of cellulose, rayon, and glass fiber or at least one selected from mixed paper thereof and the like.

The conductive polymer 125 is any polymer with electrical conductivity. For example, the conductive polymer 125 is, for example, at least one polymer selected from the group consisting of polythiophene, polypyrrole, polyaniline, and derivatives thereof. The conductive polymer 125 is typically polyethylenedioxythiophene (PEDOT) with at least one acid selected from the group consisting of p-toluenesulfonic acid, poly(styrene sulfonate) (PSS), and the like as a dopant.

The volume resistivity (Ωm) of the cathode foil 121*b*, the electrolyte solution 124, and the conductive polymer 125 is described below. The cathode foil 121*b*, which is made of a metallic material, has a lower volume resistivity than the electrolyte solution 124 and the conductive polymer 125. The conductive polymer 125 also tends to have a lower volume resistivity than the electrolyte solution 124. For example, when aluminum is used as the cathode foil 121*b*, the cathode foil 121*b* has a volume resistivity of approximately $2.65\times10^{-6}$ Ωm. When PEDOT with PSS as a dopant is used as the conductive polymer 125, the conductive polymer 125 has a volume resistivity in the range of approximately $1.0\times10^{-3}$ to $1.0\times10^{-2}$. When ESE2 (trade name) manufactured by Tayca Corporation was used as the electrolyte solution 124, the electrolyte solution 124 had the volume resistivity of approximately $5\times10^{-3}$ Ωm (200 μS/cm).

The capacitor element 120 according to the present embodiment can have high electrostatic capacitance and low ESR by using the electrolyte solution 124 and the conductive polymer 125 in combination. However, the ESR is not sufficiently decreased in some cases. This is described in detail below.

FIG. 12 is a developed view of the cathode foil 121*b* expanded in a sheet shape as in FIG. 11(*b*). As illustrated in FIG. 12, ionic conduction occurs in the length direction of the cathode foil 121*b*, and the ionic conduction distance to the cathode lead terminal 123*b* may therefore be increased. For example, the distance tends to increase to a distance from a point P farthest from the cathode lead terminal 123*b* to the cathode lead terminal 123*b*. This may increase the electrical resistance from the point P to the cathode lead terminal 123*b* and sometimes does not sufficiently reduce the ESR.

Thus, the capacitor element 120 according to the present embodiment has a configuration that can sufficiently reduce the ESR. First, an adhesion part between cathode foils is described below. FIG. 13(*a*) is a schematic cross-sectional view for explaining a laminate structure in the capacitor element 120. As illustrated in FIG. 13(*a*), in the cross section, stack units of the first separator 122*a*, the anode foil 121*a*, the second separator 122*b*, and the cathode foil 121*b* are sequentially stacked. The cathode foil 121*b* appears to be located on the opposite side of the first separator 122*a* from the anode foil 121*a*.

The anode foil 121*a* has a structure in which an anodized film 1212 is formed on a surface of a metal foil 1211. The anodized film 1212 functions as a dielectric. As illustrated in FIG. 13(*b*), the anode foil 121*a* is enlarged, for example, by etching, and the anodized film 1212 is formed on the surface of the anode foil 121*a* by chemical conversion treatment. The anode foil with a surface enlarged by the etching has an infinite number of pores on the surface and has a very large surface area. The anodized film 1212 with a thickness in the range of 10 to 100 nm is formed on the entire surface of the anode foil 121*a*. An electric charge from the cathode lead terminal 123*b* passes through the cathode foil 121*b* and charges the anodized film 1212 via the conductive polymer or the electrolyte solution of the first separator 122*a*. However, since the anodized film 1212 has insulating properties, an electric charge needs to pass through the electrolyte solution present on an end surface of the anode foil 121*a* to reach the adjacent second separator 122*b* across the anode foil 121*a*. At this time, the electrolyte solution present on the end surface of the anode foil 121*a* has an electrical conductivity of approximately 200 μS/cm and increases the ESR. When an adhesion part 140 is formed by the conductive polymer in the separators between two cathode foils 121*b*, a shortcut can be formed in the path from the point P farthest from the cathode lead terminal 123*b* to the cathode lead terminal 123*b* described with reference to FIG. 12 and can reduce the ESR. More specifically, an electric charge from the cathode lead terminal 123*b* passes through the cathode foil 121*b* and charges the anodized film 1212 via the conductive polymer or the electrolyte solution. When an electric charge passes through the cathode foil 121*b*, if an adhesion part is formed as an electrical shortcut path by the conductive polymer between the first separator 122*a* and the second separator 122*b*, an electric charge from the cathode lead terminal 123*b* reaches the cathode foil 121*b* in the periphery farther from the cathode lead terminal 123*b* via the adhesion part in a shorter distance, so that the anodized film 1212 in the periphery is efficiently charged from the cathode foil 121*b* in the periphery via the conductive polymer or the electrolyte solution in the periphery. This increases the electrical conductivity to the anodized film 1212 of the anode foil 121*a* in the periphery, that is, reduces the ESR as the characteristics of the entire element.

FIG. 14 is an explanatory view of a configuration for forming an adhesion part on two cathode foils 121*b* sandwiching the anode foil 121*a*. As illustrated in FIG. 14, in the capacitor element 120 according to the present embodiment, the first separator 122*a* and the second separator 122*b* project from the anode foil 121*a* in the planar direction and face each other. In the example of FIG. 14, the first separator 122*a* and the second separator 122*b* project upward from the anode foil 121*a* on the upper surface of the capacitor element 120.

A projecting part 122*al* of the first separator 122*a* projecting from the anode foil 121*a* has a projection length a. A projecting part 122*b*1 of the second separator 122*b* projecting from the anode foil 121*a* has a projection length a'. The anode foil 121*a* has a thickness b at a position where the projecting part 122*al* of the first separator 122*a* and the projecting part 122*b*1 of the second separator 122*b* face each other. In this case, a relationship of length a+length a'≥thickness b is satisfied.

The first separator 122*a* and the second separator 122*b* have flexibility and tend to be easily bent and folded. Thus, as illustrated in FIG. 15, the projecting part 122*al* and the projecting part 122*b*1 are likely to come into contact with each other with the anode foil 121*a* interposed therebetween. In such a case, the conductive polymer 125 of the first separator 122*a* and the conductive polymer 125 of the second separator 122*b* come into contact with each other and are electrically connected to each other. Thus, the adhesion part 140 is formed between the two cathode foils 121*b* sandwiching the anode foil 121*a*. The adhesion part 140 has a structure that allows electrical connection through a shortcut path of the cathode foil 121*b*, and connects the separators, the conductive polymers, or the separators and the conductive polymer between the first separator 122*a* and the second separator 122*b*. This can reduce the ESR of the capacitor element 120. In the formation of the conductive polymer 125 and impregnation of the electrolyte solution, the conductive polymer can further have stickiness and, at this stage, the projecting part 122*al* and the projecting part 122*b*1 can be spontaneously bonded to each other. Furthermore, by storing the projecting part 122*al* and the projecting part 122*b*1 in a housing, thereby exerting stress, they can be further bonded. Thus, in the present embodiment, the adhesion part 140 is formed by binding the projecting part 122*al* and the projecting part 122*b*1 via the conductive polymer 125.

FIGS. 16(*a*) and 16(*b*) are views for explaining an effect in a case where an adhesion part is formed in the radial direction on the upper surface of the capacitor element 120.

As illustrated in FIGS. 16(*a*) and 16(*b*), the anode lead terminal 123*a* and the cathode lead terminal 123*b* are seen on the upper surface of the capacitor element 120. The anode lead terminal 123*a* and the cathode lead terminal 123*b* are not seen on the lower surface of the capacitor element 120.

As illustrated in FIG. 16(*a*), if the adhesion part is not formed, the ion conduction path goes around multiple times before reaching the cathode lead terminal 123*b*. In contrast, as illustrated in FIG. 16(*b*), when the adhesion part 140 is formed on the upper surface of the capacitor element 120 in the radial direction, it is possible to repeatedly form short-cuts to shorten the path leading to the cathode lead terminal 123*b*.

From the perspective of facilitating contact between the projecting part 122*al* of the first separator 122*a* and the projecting part 122*b*1 of the second separator 122*b*, (length a+length a') is preferably larger than the thickness b, more preferably at least twice the thickness b.

Likewise, from the perspective of facilitating contact between the projecting part 122*a*1 of the first separator 122*a* and the projecting part 122*b*1 of the second separator 122*b*, each of the length a and the length a' is preferably 0.2 mm or more, more preferably 0.25 mm or more, still more preferably 0.3 mm or more. For example, the anode foil 121*a* and the cathode foil 121*b* have a width of 2.7 mm or more and 7.5 mm or less in the direction between the upper surface and the lower surface of the capacitor element 120. The first separator 122*a* and the second separator 122*b* have a width of 3.2 mm or more and 8.0 mm in the direction between the upper surface and the lower surface of the capacitor element 120.

Furthermore, the adhesion part 140 is preferably formed at a position close to the cathode lead terminal 123*b*. Thus, in a plan view of the capacitor element 120, the adhesion part 140 is preferably formed at least in any portion in a half region on the side where the cathode lead terminal 123*b* is located (a region on the right side of the dotted line in FIGS. 16(*a*) and 16(*b*)).

When the first separator 122*a* and the second separator 122*b* are in contact with each other, an end surface portion (end surface) of the anode foil 121*a* on the upper surface side appears to be covered with the conductive polymer 125 when the capacitor element 120 is viewed from the upper surface side. The number of formed adhesion parts 140 increases with the ratio of the end surface of the anode foil 121*a* on the upper surface side covered with the conductive polymer 125 (anode end surface coverage). Thus, it is preferable to set a lower limit to the anode end surface coverage.

In the present embodiment, the anode end surface coverage of the anode foil 121*a* can be defined as an area covered with the conductive polymer 125 with respect to the exposed area of the anode foil 121*a* on the upper surface of the capacitor element 120 when the capacitor element 120 is viewed from the upper surface side. From the perspective of forming a sufficient amount of the adhesion part 140, the anode end surface coverage is preferably 15% or more, more preferably 20% or more, still more preferably 30% or more.

The anode end surface coverage of the anode foil 121*a* can be calculated by image processing of an image of the upper surface of the capacitor element 120 before the conductive polymer 125 is formed and an image of the upper surface of the capacitor element 120 after the conductive polymer 125 is formed. First, in an image of the upper surface of the capacitor element 120 before the conductive polymer 125 is formed as illustrated in FIG. 17(*a*), the area of the end surface portion (end surface) of the anode foil 121*a* before coverage can be calculated by subtracting the areas of the first separator 122*a*, the second separator 122*b*, and a central portion and the areas of the anode lead terminal 123*a*, the cathode lead terminal 123*b*, and the cathode foil 121*b* from the total area of the capacitor element 120. In a plan view of the upper surface of the element, the area of the central portion is defined as an area calculated using the formula $\pi r^2$, on the assumption that a circle with the longest diameter of the holes in the central portion is present in the central portion and that half of the longest diameter of the circle is the radius.

Next, in an image of the upper surface of the capacitor element 120 after the conductive polymer 125 is formed as illustrated in FIG. 17(*b*), the area of the end surface portion (end surface) of the anode foil 121*a* after coverage can be calculated by subtracting the areas of the first separator 122*a*, the second separator 122*b*, and a central portion, the areas of the anode lead terminal 123*a*, the cathode lead terminal 123*b*, and the cathode foil 121*b*, and the area covered in black with the conductive polymer 125 from the total area of the capacitor element 120.

The anode end surface coverage can be calculated by calculating {(area of end surface of anode foil 121*a* before coverage)−(area of end surface of anode foil 121*a* after coverage)}/(area of end surface of anode foil 121*a* before coverage)×100(%). Alternatively, the anode end surface coverage may be the ratio of the area (black) covered with the conductive polymer 125 to the sum of the area (white) of the end surface of the anode foil 121*a* after coverage and the area (black).

As illustrated in FIG. 16(*b*), on the upper surface of the capacitor element 120, the distance required for the cathode foil 121*b* to make one turn is longer in the periphery than in the central portion. Thus, on the upper surface of the capacitor element 120, the area of the end surface of the anode foil 121*a* covered with the conductive polymer 125 preferably increases from the central portion to the periphery. Here, an increase in the area of the end surface of the anode foil 121*a* covered with the conductive polymer 125 means at least one of an increase in the absolute value of the area and an increase in the ratio of the area of the conductive polymer 125 in one turn.

Although the structure on the upper surface of the capacitor element 120 has been described with reference to FIGS. 14 to 16(*b*), also on the lower surface, the first separator 122*a* may include the projecting part 122*al* projecting toward the lower surface side, and the second separator 122*b* may include the projecting part 122*b*1 projecting toward the lower surface side. Alternatively, only one of the upper surface and the lower surface of the capacitor element 120 may be provided with the projecting part 122*al* and the projecting part 122*b*1.

However, since the cathode lead terminal 123*b* is connected to the upper surface side of the capacitor element 120 in the cathode foil 121*b*, the adhesion part 140 is preferably formed on the upper surface side of the capacitor element 120. Thus, the projecting part 122*al* and the projecting part 122*b*1 are preferably disposed on the upper surface of the capacitor element 120.

Furthermore, since a large number of adhesion parts 140 are preferably formed on the upper surface side of the capacitor element 120, when the projecting part 122*al* and the projecting part 122*b*1 are provided on both the upper surface and the lower surface, the length a and the length a' on the upper surface side are preferably longer than the length a and the length a' on the lower surface side.

The ratio of the area covered with the conductive polymer 125 to the total of the area of the end surface of the anode foil 121*a* when the capacitor element 120 is viewed from the upper surface side and the area of the end surface of the anode foil 121*a* when the capacitor element 120 is viewed from the lower surface side is preferably 20% or more, more preferably 40% or more, still more preferably 60% or more. The ratio can also be defined as the average value of the anode end surface coverage on the upper surface side and the anode end surface coverage on the lower surface side of the capacitor element 120.

Next, a method for producing the electrolytic capacitor 101 is described below. FIG. 18 is a diagram illustrating a flow of a method for producing the electrolytic capacitor 101.

(Production of Wound Body)

The first separator 122*a*, the anode foil 121*a* to which the anode lead terminal 123*a* is connected, the second separator 122*b*, and the cathode foil 121*b* to which the cathode lead terminal 123*b* is connected are stacked in this order and wound, and the outer surface thereof is fixed with a winding tape to produce a wound body. At this time, the first separator 122*a* and the second separator 122*b* project from the anode foil 121*a* on the upper surface side and the lower surface side.

(Formation of Conductive Polymer Layer)

Next, in a reduced-pressure atmosphere, the wound body is immersed in a conductive polymer dispersion liquid containing water and an organic solvent for 20 minutes and is then pulled up from the conductive polymer dispersion liquid. In this manner, the wound body can be impregnated with the conductive polymer 125. While making a residue of the conductive polymer 125 remain, the wound body is dried, thereby forming the adhesion part 140.

For example, the conductive polymer dispersion liquid preferably has a polymer concentration of 0.5% by weight or more or a viscosity of 10 mPa·s or more at 20° C. This is because if the conductive polymer dispersion liquid has a low polymer concentration, an amount of conductive polymer sufficient for forming the adhesion part does not remain on the upper surface of the element when the element is impregnated with the conductive polymer, and if the conductive polymer dispersion liquid has a low viscosity, an amount of conductive polymer necessary for bonding the first separator 122*a* and the second separator 122*b* does not remain on the upper surface of the element when the element is impregnated with the conductive polymer.

(Impregnation with Electrolyte Solution)

Next, the wound body is impregnated with a predetermined amount of electrolyte solution in a reduced-pressure atmosphere. The electrolyte solution may be a conductive polymer dispersion liquid mixed with a solute. Thus, the conductive polymer dispersion liquid can be used as the electrolyte solution. In such a case, the impregnation with the electrolyte solution is performed simultaneously with the impregnation with the conductive polymer. The solvent of the dispersion liquid of the conductive polymer may be one or more solutions selected from water and an organic solvent. In such a case, the organic solvent may be selected from at least one of a glycol compound, a lactone compound, and a sulfolane each having a boiling point of 150° C. or more, and a weight ratio of the organic solvent to water may range from 1:99 to 50:50. For example, at the time of impregnation with the conductive polymer, by impregnating the wound body with the conductive polymer dispersion liquid mixed with a solute, the wound body is impregnated with the electrolyte solution at the time of formation of the conductive polymer. Thus, when the conductive polymer is dried, and water in the wound body is removed, the organic solvent of the conductive polymer dispersion liquid remains, and the solute dissolved in the organic solvent in the conductive polymer dispersion liquid functions as the electrolyte solution. Thus, the formation of the adhesion part and the impregnation with the electrolyte solution can be simultaneously performed to shorten the production process. Furthermore, when the conductive polymer dispersion liquid is used as the electrolyte solution, the wound body may be further impregnated with an additional electrolyte solution. The impregnation amount of the additional electrolyte solution is preferably 2 times or more and 100 times or less, more preferably 5 times or more and 20 times or less, with respect to the weight of the electrolyte solution in the dispersion liquid. The composition of the additional electrolyte solution may be the same as or different from the composition of the electrolyte solution in the dispersion liquid. For example, an element that is impregnated with the dispersion liquid as the electrolyte solution and from which water is removed by drying or the like can be immersed for impregnation under reduced pressure in a bath of the additional electrolyte solution with the lead terminal disposed on the upper side such that the portion of the wound body is completely immersed, thereby introducing the additional electrolyte solution into the element.

The reason for impregnation with the additional electrolyte solution is described below. When the dispersion liquid is used as the electrolyte solution, a composite layer of the conductive polymer and the electrolyte solution is formed at the time of drying, so that both the electrical conductivity of the conductive polymer and the repair of an oxide film near the conductive polymer can be achieved. On the other hand, regarding the repair of the oxide film near the conductive polymer, although the amount of the electrolyte solution in the dispersion liquid is sufficient for the initial repair, the electrolyte solution is insufficient in view of long-term repair, and impregnation with the additional electrolyte solution is required to form an element that is stable for extended periods. Thus, when the conductive polymer dispersion liquid is used as the electrolyte solution, it is particularly effective to inject additional electrolyte solution to extend the life of the capacitor.

(Assembly of Capacitor)

Next, the wound body is sealed with the metal case 110 and the sealing body 130 to complete the electrolytic capacitor 101. Subsequently, an aging treatment may be performed while applying a rated voltage.

In the production method according to the present embodiment, the projecting part 122*al* and the projecting part 122*b*1 are likely to come into contact with each other with the anode foil 121*a* interposed therebetween, and the adhesion part 140 is formed between two cathode foils 121*b* sandwiching the anode foil 121*a*. This can reduce the ESR of the capacitor element 120.

Impregnation with the electrolyte solution after the impregnation with the conductive polymer can swell the conductive polymer 125 forming the adhesion part 140 into a wet state with stickiness. This can improve the bonding strength between the projecting part 122*al* and the projecting part 122*b*1. By adjusting the amount of electrolyte solution per unit area of the separator on at least one end surface having the adhesion part to be larger than that of the separators in the capacitor element, the adhesion part in which the conductive polymers 125 are bonded to each other is swollen and has stickiness for extended periods. In this swollen state, since the binding of the adhesion part has flexibility and stickiness due to the presence of the electrolyte solution, the binding is less likely to be damaged, for example, by an impact during use of the product, and stickiness and connection can be continuously maintained even when the binding between the separators is released.

In the above embodiment, a stack unit of the first separator 122*a*, the anode foil 121*a*, the second separator 122*b*, and the cathode foil 121*b* stacked in this order is wound, but the present invention is not limited thereto. For example, a stack unit of the first separator 122*a*, the cathode foil 121*b*, the second separator 122*b*, and the anode foil 121*a* stacked in this order may be wound.

In the above embodiment, the capacitor element 120 has an approximately cylindrical shape, but the present invention is not limited thereto. For example, the capacitor element 120 may have another columnar shape, such as a polygonal column.

In the above embodiment, the capacitor element 120 is wound, but the present invention is not limited thereto. For example, a plurality of stack units including the first separator 122*a*, the anode foil 121*a*, the second separator 122*b*, and the cathode foil 121*b* may be stacked without being wound.

EXAMPLES

The electrolytic capacitor according to the first embodiment was produced, and the characteristics thereof were examined.

Example 1

In Example 1, a wound solid electrolytic capacitor (6.3 mm in diameter×5.7 mm in length) with a rated voltage of 63 V and a rated capacitance of 56 μF was produced. A specific method for producing the solid electrolytic capacitor is described below.

(Production of Wound Body)

An anode lead terminal was connected to a prepared anode foil. A cathode lead terminal was connected to a cathode foil having a conductor layer on an end surface thereof and pretreated to improve wettability. The first separator, the cathode foil, the second separator, and the anode foil were then stacked in this order and were wound together with the lead terminals, and the outer surface was fixed with a winding tape to prepare a wound body. At this time, the positions of the first separator and the second separator were adjusted so that the projection length a of the first separator and the projection length a' of the second separator on the upper surface (the lead terminal side) of the wound body were 0.35 mm. The prepared wound body was immersed in aqueous ammonium phosphate, and a chemical conversion treatment was performed again while applying a predetermined voltage to the anode foil, thereby forming a dielectric layer mainly on an end surface of the anode foil. Subsequently, after a carbonization step and the chemical conversion step and the carbonization step again, the element was washed and dried. The anode foil had a thickness b of 0.125 mm.

(Production of Capacitor Element)

The wound body was immersed for 3 minutes in a conductive polymer precursor monomer in a predetermined container and was then pulled up from the conductive polymer precursor monomer. At this time, the anode end surface coverage with the conductive polymer precursor monomer was adjusted to approximately 96% to 99%. Next, the wound body impregnated with the conductive polymer precursor monomer was dried in a drying furnace for 45 minutes, the dried element was impregnated with an oxidizing agent at normal temperature, a residue of the oxidizing agent was removed, and polymerization was then allowed to proceed by heating. Heat treatment was then further performed as required, and after slow cooling, an aluminum solid electrolytic capacitor element with a conductive polymer layer and an adhesion part was produced.

The upper surface and the lower surface of the capacitor element were subjected to image processing to calculate the anode end surface coverage of each surface. The upper surface side had an anode end surface coverage of 98.8%. The lower surface side had an anode end surface coverage of 96.1%. The average value of the anode end surface coverages of the upper surface and the lower surface was 97.6%.

(Sealing of Capacitor Element)

The solid electrolytic capacitor element was sealed to complete a solid electrolytic capacitor. Subsequently, an aging treatment was performed for 1 hour while applying a rated voltage.

Example 2

A solid electrolytic capacitor was produced and evaluated in the same manner as in Example 1 except that the anode end surface coverage with the conductive polymer was adjusted to approximately 84% to 86% during the formation of the conductive polymer.

The upper surface and the lower surface of the capacitor element were subjected to image processing to calculate the anode end surface coverage of each surface. The upper surface side had an anode end surface coverage of 85.7%. The lower surface side had an anode end surface coverage of 83.9%. The average value of the anode end surface coverages of the upper surface and the lower surface was 84.8%.

Example 3

A solid electrolytic capacitor was produced and evaluated in the same manner as in Example 1 except that the anode end surface coverage with the conductive polymer was adjusted to approximately 73% to 75% during the formation of the conductive polymer.

The upper surface and the lower surface of the capacitor element were subjected to image processing to calculate the anode end surface coverage of each surface. The upper surface side had an anode end surface coverage of 73.4%. The lower surface side had an anode end surface coverage of 74.2%. The average value of the anode end surface coverages of the upper surface and the lower surface was 73.8%.

Example 4

The positions of the first separator and the second separator were adjusted so that the projection length a of the first separator and the projection length a' of the second separator on the upper surface (the lead terminal side) of the wound body were 0.2 mm. The anode end surface coverage with the conductive polymer was adjusted to approximately 89% to 91% during the formation of the conductive polymer. Except for this, a solid electrolytic capacitor was produced and evaluated in the same manner as in Example 1.

The upper surface and the lower surface of the capacitor element were subjected to image processing to calculate the anode end surface coverage of each surface. The upper surface side had an anode end surface coverage of 69.3%. The lower surface side had an anode end surface coverage of 70.6%. The average value of the anode end surface coverages of the upper surface and the lower surface was 70.1%.

Example 5

An electrolytic capacitor was produced and evaluated in the same manner as in Example 4 except that the anode end surface coverage with the conductive polymer was adjusted to approximately 74% to 77% during the formation of the conductive polymer.

The upper surface and the lower surface of the capacitor element were subjected to image processing to calculate the anode end surface coverage of each surface. The upper surface side had an anode end surface coverage of 54.2%. The lower surface side had an anode end surface coverage of 56.8%. The average value of the anode end surface coverages of the upper surface and the lower surface was 55.5%.

Example 6

An electrolytic capacitor was produced and evaluated in the same manner as in Example 4 except that the anode end surface coverage with the conductive polymer was adjusted to approximately 68% to 71% during the formation of the conductive polymer.

The upper surface and the lower surface of the capacitor element were subjected to image processing to calculate the anode end surface coverage of each surface. The upper surface side had an anode end surface coverage of 45.7%. The lower surface side had an anode end surface coverage of 50.4%. The average value of the anode end surface coverages of the upper surface and the lower surface was 48.1%.

Comparative Example 1

The positions of the first separator and the second separator were adjusted so that the projection length a of the first separator and the projection length a' of the second separator on the upper surface (the lead terminal side) of the wound body were 0.06 mm. The anode end surface coverage with the conductive polymer was adjusted to approximately 22% to 25% during the formation of the conductive polymer. Except for this, an electrolytic capacitor was produced and evaluated in the same manner as in Example 1.

The upper surface and the lower surface of the capacitor element were subjected to image processing to calculate the anode end surface coverage of each surface. The upper surface side had an anode end surface coverage of 34.9%. The lower surface side had an anode end surface coverage of 32.5%. The average value of the anode end surface coverages of the upper surface and the lower surface was 33.7%.

Comparative Example 2

The positions of the first separator and the second separator were adjusted so that the projection length a of the first separator and the projection length a' of the second separator on the upper surface (the lead terminal side) of the wound body were 0.04 mm. The anode end surface coverage with the conductive polymer was adjusted to approximately 18% to 21% during the formation of the conductive polymer. Except for this, an electrolytic capacitor was produced and evaluated in the same manner as in Comparative Example 1.

The upper surface and the lower surface of the capacitor element were subjected to image processing to calculate the anode end surface coverage of each surface. The upper surface side had an anode end surface coverage of 18.2%. The lower surface side had an anode end surface coverage of 20.4%. The average value of the anode end surface coverages of the upper surface and the lower surface was 19.3%.

(Analysis)

The electrostatic capacitance and the ESR value of each electrolytic capacitor produced in Examples 1 to 6 and Comparative Examples 1 and 2 were determined by the following procedure. The ESR value (initial ESR value) (mΩ) of the electrolytic capacitor at a frequency of 100 kHz was measured with an LCR meter for four-terminal measurement.

The ESR in Example 1 was 12.7 mΩ. The ESR in Example 2 was 13.3 mΩ. The ESR in Example 3 was 15.8 mΩ. The ESR in Example 4 was 17.2 mΩ. The ESR in Example 5 was 19.4 mΩ. The ESR in Example 6 was 20.8 mΩ. The ESR in Comparative Example 1 was 26.5 mΩ. The ESR in Comparative Example 2 was 31.6 mΩ. Table 1 shows the results.

TABLE 1

| | Length a, Length a' (mm) | Thickness b (mm) | Upper surface coverage (%) | Lower surface coverage (%) | Average | ESR (mΩ) |
|---|---|---|---|---|---|---|
| Example 1 | 0.35 | 0.125 | 98.8 | 96.1 | 97.6 | 12.7 |
| Example 2 | 0.35 | 0.125 | 85.7 | 83.9 | 84.8 | 13.3 |
| Example 3 | 0.35 | 0.125 | 73.4 | 74.2 | 73.8 | 15.8 |
| Example 4 | 0.2 | 0.125 | 69.3 | 70.6 | 70.1 | 17.2 |
| Example 5 | 0.2 | 0.125 | 54.2 | 56.8 | 55.5 | 19.4 |
| Example 6 | 0.2 | 0.125 | 45.7 | 50.4 | 48.1 | 20.8 |
| Comparative example 1 | 0.06 | 0.125 | 34.9 | 32.5 | 33.7 | 26.5 |
| Comparative example 2 | 0.04 | 0.125 | 18.2 | 20.4 | 19.3 | 31.6 |

In Comparative Examples 1 and 2, the ESR was high. This is probably because the relationship of length a+length a'≥thickness b was not satisfied, so that the separators were not in contact with each other, and the adhesion part of the conductive polymer was not formed between two cathode foils sandwiching the anode foil. In contrast, the ESR was lower in Examples 1 to 6 than in Comparative Examples 1 and 2. This is probably because the relationship of length a+length a'≥thickness b was satisfied, so that the separators were in contact with each other, and the adhesion part of the conductive polymer was formed between two cathode foils sandwiching the anode foil. Examination of the ESR in Examples 1 to 6 shows that the ESR decreases as the anode end surface coverage increases. This result shows that a larger number of adhesion parts were formed as the anode end surface coverage increases.

The electrolytic capacitor according to the second embodiment was produced, and the characteristics thereof were examined.

Example 7

In Example 7, a wound electrolytic capacitor (10 mm in diameter×10 mm in length) with a rated voltage of 63 V and a rated capacitance of 56 μF was produced. A specific method for producing the electrolytic capacitor is described below.

(Production of Wound Body)

An anode lead terminal was connected to a prepared anode foil. A cathode lead terminal was connected to a cathode foil having a conductor layer on an end surface thereof and pretreated to improve wettability. The first separator, the cathode foil, the second separator, and the anode foil were then stacked in this order and were wound together with the lead terminals, and the outer surface was fixed with a winding tape to prepare a wound body. At this time, the positions of the first separator and the second separator were adjusted so that the projection length a of the first separator and the projection length a' of the second separator on the upper surface (the lead terminal side) of the wound body were 0.35 mm. The prepared wound body was immersed in aqueous ammonium phosphate, and a chemical conversion treatment was performed again at 85° C. while applying a voltage of 143 V to the anode foil, thereby forming a dielectric layer mainly on an end surface of the anode foil. The anode foil had a thickness b of 0.125 mm.

(Production of Capacitor Element)

In a reduced-pressure atmosphere (80 kPa), the wound body was immersed for 20 minutes in an aqueous dispersion of a conductive polymer contained in a predetermined container and was then pulled up from the dispersion. At this time, the anode end surface coverage with the conductive polymer was adjusted to approximately 96%. The wound body impregnated with the conductive polymer was then dried in a drying furnace at 150° C. for 60 minutes to bind the conductive polymer of each layer, thereby forming an adhesion part. In this manner, a capacitor element with an adhesion part was produced.

The upper surface and the lower surface of the capacitor element were subjected to image processing to calculate the anode end surface coverage of each surface. The upper surface side had an anode end surface coverage of 97.3%. The lower surface side had an anode end surface coverage of 95.4%. The average value of the anode end surface coverages of the upper surface and the lower surface was 96.3%.

(Impregnation with Electrolyte Solution)

The capacitor element was impregnated with a predetermined amount of electrolyte solution in a reduced-pressure atmosphere (92 kPa) to place the electrolyte solution in the adhesion part and form a sticky adhesion part, and the amount of electrolyte solution per unit area was adjusted to be larger in the separator on at least one end surface having the adhesion part than in the separators in the capacitor element. ESE2 manufactured by Tayca Corporation was used as the electrolyte solution. In this manner, the adhesion part in which the conductive polymers are bonded to each other is swollen and has stickiness for extended periods.

(Sealing of Capacitor Element)

The capacitor element impregnated with the electrolyte solution was sealed to complete an electrolytic capacitor. Subsequently, an aging treatment was performed at 85° C. for 1 hour while applying a rated voltage.

Example 8

An electrolytic capacitor was produced and evaluated in the same manner as in Example 7 except that the anode end surface coverage with the conductive polymer was adjusted to approximately 53% during the formation of the conductive polymer.

The upper surface and the lower surface of the capacitor element were subjected to image processing to calculate the anode end surface coverage of each surface. The upper surface side had an anode end surface coverage of 61.2%. The lower surface side had an anode end surface coverage of 43.9%. The average value of the anode end surface coverages of the upper surface and the lower surface was 52.5%.

Example 9

An electrolytic capacitor was produced and evaluated in the same manner as in Example 7 except that the anode end surface coverage with the conductive polymer was adjusted to approximately 24% during the formation of the conductive polymer.

The upper surface and the lower surface of the capacitor element were subjected to image processing to calculate the anode end surface coverage of each surface. The upper surface side had an anode end surface coverage of 28.4%. The lower surface side had an anode end surface coverage of 18.8%. The average value of the anode end surface coverages of the upper surface and the lower surface was 23.6%.

Example 10

The positions of the first separator and the second separator were adjusted so that the projection length a of the first separator and the projection length a' of the second separator on the upper surface (the lead terminal side) of the wound body were 0.2 mm. The anode end surface coverage with the conductive polymer was adjusted to approximately 76% during the formation of the conductive polymer. Except for this, an electrolytic capacitor was produced and evaluated in the same manner as in Example 7.

The upper surface and the lower surface of the capacitor element were subjected to image processing to calculate the anode end surface coverage of each surface. The upper surface side had an anode end surface coverage of 78.6%. The lower surface side had an anode end surface coverage of 72.5%. The average value of the anode end surface coverages of the upper surface and the lower surface was 75.6%.

Example 11

An electrolytic capacitor was produced and evaluated in the same manner as in Example 10 except that the anode end surface coverage with the conductive polymer was adjusted to approximately 39% during the formation of the conductive polymer.

The upper surface and the lower surface of the capacitor element were subjected to image processing to calculate the anode end surface coverage of each surface. The upper surface side had an anode end surface coverage of 45.6%. The lower surface side had an anode end surface coverage of 32.9%. The average value of the anode end surface coverages of the upper surface and the lower surface was 39.3%.

Example 12

An electrolytic capacitor was produced and evaluated in the same manner as in Example 10 except that the anode end surface coverage with the conductive polymer was adjusted to approximately 20% during the formation of the conductive polymer.

The upper surface and the lower surface of the capacitor element were subjected to image processing to calculate the anode end surface coverage of each surface. The upper surface side had an anode end surface coverage of 24.7%. The lower surface side had an anode end surface coverage of 16.2%. The average value of the anode end surface coverages of the upper surface and the lower surface was 20.4%.

Comparative Example 3

The positions of the first separator and the second separator were adjusted so that the projection length a of the first separator and the projection length a' of the second separator on the upper surface (the lead terminal side) of the wound body were 0.06 mm. The anode end surface coverage with the conductive polymer was adjusted to approximately 11% during the formation of the conductive polymer. Except for this, an electrolytic capacitor was produced and evaluated in the same manner as in Example 7.

The upper surface and the lower surface of the capacitor element were subjected to image processing to calculate the anode end surface coverage of each surface. The upper surface side had an anode end surface coverage of 13.9%. The lower surface side had an anode end surface coverage of 9.0%. The average value of the anode end surface coverages of the upper surface and the lower surface was 11.4%.

Comparative Example 4

An electrolytic capacitor was produced and evaluated in the same manner as in Comparative Example 3 except that the anode end surface coverage with the conductive polymer was adjusted to approximately 8% during the formation of the conductive polymer.

The upper surface and the lower surface of the capacitor element were subjected to image processing to calculate the anode end surface coverage of each surface. The upper surface side had an anode end surface coverage of 9.5%. The lower surface side had an anode end surface coverage of 6.4%. The average value of the anode end surface coverages of the upper surface and the lower surface was 8.0%.

(Analysis)

The electrostatic capacitance and the ESR value of each electrolytic capacitor produced in Examples 7 to 12 and Comparative Examples 3 and 4 were determined by the following procedure. The electrostatic capacitance (initial electrostatic capacitance) (μF) of the electrolytic capacitor at a frequency of 120 Hz was measured with the LCR meter for four-terminal measurement. The ESR value (initial ESR value) (mΩ) of the electrolytic capacitor at a frequency of 100 kHz was measured with the LCR meter for four-terminal measurement.

The ESR in Example 7 was 9.5 mΩ. The ESR in Example 8 was 10.4 mΩ. The ESR in Example 9 was 12.6 mΩ. The ESR in Example 10 was 13.5 mΩ. The ESR in Example 11 was 14.2 mΩ. The ESR in Example 12 was 18.3 mΩ. The ESR in Comparative Example 3 was 30.7 mΩ. The ESR in Comparative Example 4 was 34.2 mΩ. Table 2 shows the results.

TABLE 2

| | Length a, Length a' (mm) | Thickness b (mm) | Upper surface coverage (%) | Lower surface coverage (%) | Average | ESR (mΩ) |
|---|---|---|---|---|---|---|
| Example 7 | 0.35 | 0.125 | 97.3 | 95.4 | 96.3 | 9.5 |
| Example 8 | 0.35 | 0.125 | 61.2 | 43.9 | 52.5 | 10.4 |
| Example 9 | 0.35 | 0.125 | 28.4 | 18.8 | 23.6 | 12.6 |
| Example 10 | 0.2 | 0.125 | 78.6 | 72.5 | 75.6 | 13.5 |
| Example 11 | 0.2 | 0.125 | 45.6 | 32.9 | 39.3 | 14.2 |
| Example 12 | 0.2 | 0.125 | 24.7 | 16.2 | 20.4 | 18.3 |
| Comparative example 3 | 0.06 | 0.125 | 13.9 | 9.0 | 11.4 | 30.7 |
| Comparative example 4 | 0.04 | 0.125 | 9.5 | 6.4 | 8.0 | 34.2 |

In Comparative Examples 3 and 4, the ESR was high. This is probably because the relationship of length a+length a'≥thickness b was not satisfied, so that the separators were not in contact with each other, and the adhesion part of the conductive polymer was not formed between two cathode foils sandwiching the anode foil. In contrast, the ESR was lower in Examples 7 to 12 than in Comparative Examples 3 and 4. This is probably because the relationship of length a+length a'≥thickness b was satisfied, so that the separators were in contact with each other, and the adhesion part of the conductive polymer was formed between two cathode foils sandwiching the anode foil. Examination of the ESR in Examples 7 to 12 shows that the ESR decreases as the anode end surface coverage increases. This result shows that a larger number of adhesion parts were formed as the anode end surface coverage increases.

Although the examples of the present invention have been described in detail above, the present invention is not limited to the specific examples, and various modifications and changes can be made within the scope of the gist of the present invention described in the claims.

DESCRIPTION OF THE SYMBOLS

1 electrolytic capacitor
10 metal case
11 opening portion
12 transversal throttling groove
20 capacitor element
21*a* anode foil
21*b* cathode foil
22*a* first separator
22*b* second separator
23*a* anode lead terminal
23*b* cathode lead terminal
30 sealing body
31*a*, 31*b* lead insertion hole

The invention claimed is:

1. An electrolytic capacitor comprising:

a capacitor element in which a first separator, an anode foil connected to an extraction lead terminal and having an anodized film on a surface thereof, a second separator, and a cathode foil connected to an extraction lead terminal are sequentially disposed and in which a conductive polymer is formed, wherein the first separator and the second separator project from the anode foil in a planar direction and face each other in a manner of each having the conductive polymer, wherein the first separator and the second separator are at least partially fixed in a manner of being electrically connected by the conductive polymer, forming an adhesion part thereat.

2. The electrolytic capacitor according to claim 1, wherein the adhesion part is an electrical short-circuit path of the cathode foil.

3. The electrolytic capacitor according to claim 1, wherein:

the first separator and the second separator have projecting parts that project from the anode foil in a planar direction and face each other and that contain the conductive polymer, a relationship of length a+length a'≥thickness b is satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the conductive polymer fixes at least part of the projecting part of the first separator and at least part of the projecting part of the second separator.

4. The electrolytic capacitor according to claim 3, wherein each of the length a and the length a' is 0.2 mm or more.

5. The electrolytic capacitor according to claim 3, wherein:

the first separator, the anode foil, the second separator, and the cathode foil are wound together and have a roughly columnar shape, the extraction lead terminal connected to the anode foil and the extraction lead terminal connected to the cathode foil are provided on a first bottom face of the roughly columnar shape having the first bottom face and a second bottom face, and a projection length of the projecting parts of the first separator and the second separator on the first bottom face is greater than a projection length of the projecting parts of the first separator and the second separator on the second bottom face.

6. The electrolytic capacitor according to claim 1, wherein:

the first separator, the anode foil, the second separator, and the cathode foil are wound together and have a roughly columnar shape, and the extraction lead terminal connected to the anode foil and the extraction lead terminal connected to the cathode foil are provided on a first bottom face of the roughly columnar shape having the first bottom face and a second bottom face.

7. The electrolytic capacitor according to claim 6, wherein a total of an area covered with the conductive polymer in an exposed portion of the anode foil on the first bottom face and an area covered with the conductive polymer in an exposed portion of the anode foil on the second bottom face is 48% or more of a total area of the exposed portions of the anode foil on the first bottom face and the second bottom face.

8. The electrolytic capacitor according to claim 6, wherein an area covered with the conductive polymer in an exposed portion of the anode foil on the first bottom face is 45% or more of an area of the exposed portion of the anode foil on the first bottom face.

9. The electrolytic capacitor according to claim 6, wherein on at least one of the first bottom face and the second bottom face, an area of an exposed portion of the anode foil covered with the conductive polymer increases from a central portion to a periphery thereof.

10. The electrolytic capacitor according to claim 6, wherein in an axial direction of the roughly columnar shape, an amount of electrolyte solution per unit area of the first separator and the second separator is larger on the first bottom face side and the second bottom face side than on a central side.

11. The electrolytic capacitor according to claim 1, wherein:

the anode foil is an aluminum foil or an aluminum alloy foil, and the cathode foil is a valve metal foil, an alloy foil of a valve metal, or a foil in which a conductive layer is formed on a surface of a valve metal.

12. The electrolytic capacitor according to claim 1, wherein in the adhesion part at least one of the first separator and the second separator is inclined with respect to a cylindrical axis of the capacitor element.

13. The electrolytic capacitor according to claim 1, wherein the capacitor element contains water.

14. The electrolytic capacitor according to claim 1, wherein the conductive polymer layer is formed by polymerizing a precursor monomer.

15. The electrolytic capacitor according to claim 1, wherein the first separator and the second separator are at least one selected from cellulose, rayon, and glass fiber.

16. The electrolytic capacitor according to claim 1, wherein in a plan view of the capacitor element, the adhesion part is formed at least in a half region on a side where the lead terminal connected to the cathode foil is located.

17. The electrolytic capacitor according to claim 1, wherein:

the capacitor element is impregnated with an electrolyte solution, the first separator and the second separator have projecting parts that project from the anode foil and the cathode foil in a planar direction and face each other and contain the conductive polymer, a relationship of length a+length a'≥thickness b is satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the conductive polymer binds at least part of the projecting part of the first separator and at least part of the projecting part of the second separator, thereby forming the adhesion part.

18. The electrolytic capacitor according to claim 17, wherein the adhesion part contains and is swollen with the electrolyte solution, is in a wet state, and has stickiness.

19. The electrolytic capacitor according to claim 17, wherein:

the adhesion part has a structure that allows electrical connection through a short-circuit path of the cathode foil, and contains and is swollen with the electrolyte solution, is in a wet state, and has stickiness so that, between the first separator and the second separator, connected are the separators to each other, the conductive polymers to each other, or either separator and either conductive polymer.

20. The electrolytic capacitor according to claim 19, wherein an area covered with the conductive polymer on an end surface of the anode foil on the first bottom face is 15% or more of an area of the end surface of the anode foil on the first bottom face.

21. The electrolytic capacitor according to claim 19, wherein in an axial direction of the capacitor element with the roughly columnar shape, an amount of electrolyte solution per unit area of the first separator and the second separator is larger on a first bottom face side and a second bottom face side than on a central side.

22. The electrolytic capacitor according to claim 17, wherein each of the length a and the length a' is 0.2 mm or more.

23. The electrolytic capacitor according to claim 17, wherein:

the first separator, the anode foil, the second separator, and the cathode foil are sequentially stacked, are wound together, and have a roughly columnar shape, and the extraction lead terminal connected to the anode foil and the extraction lead terminal connected to the cathode foil are provided on a first bottom face of the roughly columnar shape having the first bottom face and a second bottom face.

24. The electrolytic capacitor according to claim 23, wherein a total of an area covered with the conductive polymer on an end surface of the anode foil on the first bottom face and an area covered with the conductive polymer on an end surface of the anode foil on the second bottom face is 20% or more of a total area of the end surfaces of the anode foil on the first bottom face and the second bottom face.

25. The electrolytic capacitor according to claim 23, wherein on an end surface of the anode foil on at least one of the first bottom face and the second bottom face, an area covered with the conductive polymer increases from a central portion to a periphery thereof.

26. The electrolytic capacitor according to claim 17, wherein the conductive polymer layer is formed from a conductive polymer dispersion liquid with a polymer concentration of 0.5% by weight or more or a viscosity of 10 mPa·s or more.

27. The electrolytic capacitor according to claim 17, wherein the first separator and the second separator are one of cellulose, rayon, and glass fiber, or mixed paper thereof.

28. The electrolytic capacitor according to claim 17, wherein in a plan view of the capacitor element, the adhesion part is formed at least in one of half regions on a side where the lead terminal connected to the cathode foil is located.

29. The electrolytic capacitor according to claim 17, wherein the adhesion part swells when the capacitor element is impregnated with the electrolyte solution, and has stickiness in a wet state.

30. A method for producing an electrolytic capacitor, comprising:

in a capacitor element in which a first separator, an anode foil connected to an extraction lead terminal and having an anodized film on a surface thereof, a second separator, and a cathode foil connected to an extraction lead terminal are sequentially disposed and in which the first separator and the second separator project from the anode foil in a planar direction and face each other, impregnating the first separator and the second separator with a precursor monomer to form a conductive polymer in the capacitor element, and fixing at least partially the first separator and the second separator in a manner of being electrically connected by the conductive polymer, thereby forming an adhesion part.

31. The method for producing an electrolytic capacitor according to claim 30, wherein:

the first separator and the second separator have projecting parts that project from the anode foil in a planar direction and face each other and that contain the conductive polymer, a relationship of length a+length a'≥thickness b is satisfied, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, and the adhesion part is formed between the projecting parts of the first separator and the second separator.

32. The method for producing an electrolytic capacitor according to claim 30, comprising: when a step of impregnating the capacitor element with the precursor monomer and polymerizing the precursor monomer is repeated once or multiple times to form a solid electrolyte layer, simultaneously fixing also the projecting parts of the first separator and the second separator, thereby forming the adhesion part.

33. The method for producing an electrolytic capacitor according to claim 30, comprising: to adjust a surface coverage of the adhesion part of the projecting parts of the first separator and the second separator, impregnating or attaching the conductive polymer to the first separator and the second separator again to form a solid electrolyte layer and thereby increase a portion of adhesion.

34. The method for producing an electrolytic capacitor according to claim 30, wherein:

a relationship of length a+length a'≥thickness b is satisfied in the capacitor element, wherein the length a denotes a projection length of the projecting part of the first separator, the length a' denotes a projection length of the projecting part of the second separator, and the thickness b denotes a thickness of the anode foil at a position where the projecting parts of the first separator and the second separator face each other, the method comprising:

a step of impregnating the projecting parts of the first separator and the second separator with the conductive polymer and removing water, thereby forming the adhesion part between the projecting parts of the first separator and the second separator, wherein connected via shortcut path are the cathode foils to each other or either separator and either cathode foil; and a step of impregnating the capacitor element with an electrolyte solution to swell the conductive polymer forming the adhesion part into a wet state with stickiness.

35. The method for producing an electrolytic capacitor according to claim 34, comprising removing the water by drying.

36. The method for producing an electrolytic capacitor according to claim 34, comprising: when the capacitor element is impregnated with the electrolyte solution, injecting the electrolyte solution into the conductive polymer to swell the conductive polymer forming the adhesion part into a wet state with stickiness.

37. The method for producing an electrolytic capacitor according to claim 34, comprising: at the time of impregnation with the conductive polymer, mixing a dispersion liquid of the conductive polymer with a solute, removing water, and using the dispersion liquid of the conductive polymer as the electrolyte solution to impregnate the capacitor element with the electrolyte solution and to swell the conductive polymer forming the adhesion part into a wet state with stickiness.

38. The method for producing an electrolytic capacitor according to claim 34, comprising: when a dispersion liquid of the conductive polymer is used as the electrolyte solution, further injecting the electrolyte solution into the capacitor element.

39. The method for producing an electrolytic capacitor according to claim 34, comprising: when a dispersion liquid of the conductive polymer is used as the electrolyte solution, using one or more solutions selected from water and an organic solvent as a solvent of the dispersion liquid of the conductive polymer.

40. The method for producing an electrolytic capacitor according to claim 39, wherein the organic solvent is selected from at least one of a glycol compound, a lactone compound, and a sulfolane each having a boiling point of 150° C. or more, and a weight ratio of the organic solvent to water ranges from 1:99 to 50:50.

* * * * *